United States Patent [19]
Kasuga et al.

[11] Patent Number: 5,365,139
[45] Date of Patent: Nov. 15, 1994

[54] ELECTRONIC APPARATUS WITH ULTRASONIC MOTOR

[75] Inventors: Masao Kasuga; Tatsunori Inoue; Jun Hirotomi; Hiroshi Kitamura, all of Tokyo, Japan

[73] Assignee: Seiko Instruments Inc., Japan

[21] Appl. No.: 36,033

[22] Filed: Mar. 23, 1993

[30] Foreign Application Priority Data

Mar. 24, 1992 [JP] Japan .................. 4-066367

[51] Int. Cl.$^5$ .................. H01L 41/08
[52] U.S. Cl. .................. 310/316; 318/116
[58] Field of Search ........... 310/316, 317, 323, 328; 318/116; 367/76

[56] References Cited

U.S. PATENT DOCUMENTS

| | | | |
|---|---|---|---|
| 4,713,571 | 12/1987 | Suzuki et al. | 310/316 |
| 4,749,896 | 6/1988 | Suzuki et al. | 310/316 |
| 4,794,294 | 12/1988 | Shimizu et al. | 310/316 |
| 5,130,619 | 7/1992 | Izuno | 318/116 |
| 5,155,418 | 10/1992 | Kataoka | 318/116 |
| 5,165,047 | 11/1992 | Shimizu | 318/116 |
| 5,176,630 | 12/1992 | Tanaka | 310/316 |
| 5,198,732 | 3/1993 | Morimoto | 318/116 |

Primary Examiner—Mark O. Budd
Attorney, Agent, or Firm—Bruce L. Adams; Van C. Wilks

[57] ABSTRACT

An electronic apparatus which is equipped with an ultrasonic motor and which consumes only a small amount of electric power, is stable in performance, and is capable of accurately controlling the angular position is offered.

A driving pulse storage circuit stores driving pulses corresponding to the environment of the components of the ultrasonic motor. A stopping pulse storage circuit stores stopping pulses corresponding to the environment of the components of the motor. An environment detection means detects the environment of the components. An output pulse-selecting circuit receives the output signal from a driving pulse-generating circuit and the output signal from a stopping pulse-generating circuit and produces output pulses corresponding to the output signal from a detection signal-generating circuit to a piezoelectric vibrator-driving circuit. The moving member and the output means are operated by ultrasonic vibration of the vibrating member.

8 Claims, 26 Drawing Sheets

ELECTRONIC APPARATUS WITH ULTRASONIC MOTOR

BACKGROUND OF THE INVENTION

The present invention relates to an electronic apparatus which is equipped with an ultrasonic motor and which is operated by output pulses corresponding to the environment or the states of the components of the electronic apparatus or to the environment around the components of the electronic apparatus.

FIG. 26 is a block diagram of the prior art electronic apparatus equipped with an ultrasonic motor. As shown in FIG. 26, an oscillator circuit 202 is powered by a power supply 201 and delivers a given output signal. A frequency division circuit 203 receives the output signal from the oscillator circuit 202 and divides the frequency. A timing signal generating circuit 204 receives the output signal from the frequency division circuit 203 and delivers a given timing signal. An output pulse-generating circuit 230 receives the output signal from the timing signal generating circuit 204, receives the output signal from a driving pulse-generating circuit 206, and delivers output pulses. A piezoelectric vibrator-driving circuit 208 receives the output signal from the output pulse-generating circuit 230 and delivers an output signal which produces ultrasonic vibration that activates the ultrasonic motor.

The piezoelectric vibrator-driving circuit 208 applies a given high frequency voltage to a piezoelectric vibrator 144. Ultrasonic vibration is induced in vibrating member 143. A moving member 142 is rotated or otherwise operated. A pressure-regulating spring 141 applies a given pressure to the vibrating member 143 and to the moving member 142.

FIG. 27 is a cross-sectional view of the prior art ultrasonic motor. As shown in FIG. 27, a central shaft 146 is rigidly fixed to an anchor block 147. The vibrating member 143 is firmly mounted to the central shaft 146. The piezoelectric vibrator 144 is adhesively bonded to the underside of the vibrating member 143. The piezoelectric vibrator 144 is polarized into a given shape. A lead wire 145 connects the electrode pattern on the piezoelectric vibrator 144 with a circuit for driving the piezoelectric vibrator.

The vibrating member 143 has a plurality of comb-like projections 143a. The moving member 142 is brought into contact with the comb-like projections 143a of the vibrating member 143 via friction member 148. The moving member 142 is mounted to the central shaft 146 so as to be rotatable. The pressure-regulating spring 141 presses the moving member 142 against the comb-like projections 143a of the vibrating member 143. A given high frequency voltage is applied to the piezoelectric vibrator 144 from the piezoelectric vibrator-driving circuit. Ultrasonic vibration is induced in the vibrating member 143. The moving member 142 is rotated via the frictional force of the friction member 148.

FIG. 28 is a perspective view of the prior art traveling-wave type ultrasonic motor. A plurality of comb-like projections 123a are equally spaced from each other on a vibrating member 123. A moving member 122 is brought into contact with the comb-like projections 123a to the vibrating member 123 via friction member. A pressure-regulating spring 121 presses the moving member 122 against the comb-like projections 123a of the vibrating member 123. A plurality of high frequency voltages which are out of phase with each other are applied to a piezoelectric vibrator 124 from a piezoelectric vibrator-driving circuit. The moving member 122 is rotated by traveling wave produced in the vibrating member 123. This prior art structure is disclosed in, for example, Patent Laid-Open No. JP-A-177874/1989.

FIG. 29 is a perspective view of the prior are standing wave type ultrasonic motor. A vibrating body 133 is provided with a plurality of comb-like projections 133a corresponding to the wave number of a standing wave. A moving member 132 is brought into contact with the comb-like projections 133a of the vibrating member 133 via friction member. A pressure-regulating spring 131 the moving member 132 against the comb-like projections 133a of the vibrating member 133. On high frequency voltage is applied to a piezoelectric vibrator 134 from a piezoelectric vibrator-driving circuit. The moving member 132 is rotated by the standing wave induced in the vibrating member 133. This prior art structure is disclosed in, for example, Patent Laid-Open No. JP-A-107472/1988.

The conventional electric apparatus equipped with an ultrasonic motor have the following problems.

(1) Since given output pulses are delivered irrespective of rotation of the ultrasonic motor, it is difficult to reduce the electric power consumed.

(2) Since the operation is not controlled according to the environment of the components of the ultrasonic motor or according to the environment around the components, it is difficult to stabilize the performance in operation.

(3) It is difficult to precisely control the angular position of the ultrasonic motor.

SUMMARY OF THE INVENTION

It is an object of the present invention to provide an electronic apparatus which is equipped with an ultrasonic motor and which consumes only a small amount of electric power, shows stable performance in operation, and is capable of precisely controlling the angular position, The above problems are solved in accordance with the teachings of the invention by an electronic apparatus equipped with an ultrasonic motor, the apparatus comprising: a driving pulse storage circuit storing a plurality of driving pulses which produced given ultrasonic vibration in a vibrating member to operate a moving member; a driving pulse-generating circuit which receives the output signal from the driving pulse storage circuit and produces the driving pulses; a stopping pulse storage circuit which stores a plurality of stopping pulses for stopping the operation of the moving member; a stopping pulse-generating circuit which receives the output signal from the stopping pulse storage circuit and produces the stopping pulses; an environment detection means which detects the environment or the states of the components of the electronic apparatus or the environment around the components of the electronic apparatus and delivers an output signal corresponding to the environment; and an output pulse-selecting circuit which receives the output signal from the driving pulse-generating circuit and the output signal from the stopping pulse-generating circuit, and controls an operation for producing output pulses corresponding to the result of the detection made by the environment detection means to the ultrasonic vibration-generating circuit.

Also, the present invention provides an electronic apparatus equipped with an ultrasonic motor said apparatus comprising: a driving pulse storage circuit storing a plurality of driving pulses which produce given ultrasonic vibrating in the vibrating member to operate the moving member; a driving pulse-generating circuit which receives the output signal from the driving pulse storage circuit and produces the driving pulses; an environment detection means which detects the environment or the states of the components of the electronic apparatus or the environment around the components of the electronic apparatus and delivers an output signal corresponding to the environment; and an output pulse-selecting circuit which receives the output signal from the driving pulse-generating circuit and controls an operation for producing output pulses corresponding to the result of the detection made by the environment detection means to the ultrasonic vibration-generating circuit.

In the electronic apparatus equipped with the ultrasonic motor constructed as described above, the oscillator circuit is powered by the power supply and delivers a given output signal. The frequency division circuit receives the output signal from the oscillator circuit and divides the frequency. The timing signal generating circuit receives the output signal from the frequency division circuit and delivers a given timing signal. The driving pulse storage circuit stores a plurality of driving pulses which induce given ultrasonic vibration in the vibrator to activate the moving member. The driving pulse-generating circuit receives the output signal from the driving pulse storage circuit and produces the driving pulses. The stopping pulse storage circuit stores a plurality of stopping pulses for stopping the operation of the moving member. The stopping pulse-generating circuit receives the output signal from the stopping pulse storage circuit and produces the stepping pulses. The environment detection means detects the environment or states of the components of the apparatus or the environment around the components and delivers an output signal corresponding to the environment. The environment detection means detects the state of rotation of the ultrasonic motor, the supply voltage, and the temperature around the ultrasonic motor.

The output pulse-selecting circuit receives the output signal from the driving pulse-generating circuit and the output signal from the stopping pulse-generating circuit and controls the operation that produces output pulses corresponding to the result of detection made by the environment detection means to the ultrasonic vibration-generating circuit. The ultrasonic vibration-generating circuit applies a given high frequency voltage to the piezoelectric vibrator. Ultrasonic vibration is induced in the vibrating member. The moving member is rotated or otherwise activated. The pressure-regulating mean applies a given pressure to the vibrating member and to the moving member. The output means is operated by operation of the moving member.

In operation, the performance of the novel electronic apparatus equipped with the ultrasonic motor is regulated against the environment or the state of the components or against the environment around the components. The electric power consumed is small. The angular position can be precisely controlled.

FIG. 1 is a functional block diagram of an electronic apparatus according to the invention, the apparatus being equipped with an ultrasonic motor.

An oscillator circuit 202 is powered by a power supply 201 and delivers a given output signal. A quartz oscillator or other oscillator source is connected with the oscillator circuit 202. A frequency division circuit 203 receives the output signal from the oscillator circuit 202 and divides the frequency. A timing signal generating circuit 204 receives the output signal from the frequency division circuit 203 and delivers a given timing signal.

A driving pulse storage circuit 205 stores a plurality of driving pulses which induce given ultrasonic vibration in a vibrating member 222 to activate a moving member 223. The driving pulse storage circuit 205 stores driving pulses under various conditions adapted to be produced according to the environment or the states of the components of the ultrasonic motor or according to the environment around the components. A driving pulse-generating circuit 206 receives the output signal from the driving pulse storage circuit 205 and produces the driving pulses.

A stopping pulse storage circuit 210 stores a plurality of stopping pulses for stopping the operation of the moving member 223. The stopping pulse storage circuit 210 stores stopping pulses under various conditions adapted to be produced according to the environment or the states of the components of the ultrasonic motor or according to the environment around the components. A stopping pulse-generating circuit 209 receives the output signal from the stopping pulse storage circuit 210 and produces the stopping pulses.

An environment detection means 231 detects the environment or the states of the components of the apparatus or the environment around the components. A detection signal-generating circuit 232 receives the output signal corresponding to information about the environment detected by the environment detection means 231 and delivers an output signal corresponding to the environment. In this example, the environment detection means 231 detects the state of rotation of the moving member 223 of the ultrasonic motor, the voltage of the power supply 201, the temperature around the ultrasonic motor, and other information about the environment.

An output pulse-selecting circuit 207 receives the output signal from the driving pulse-generating circuit 206 and the output signal from the stopping pulse-generating circuit 209 and controls the operation in which output pulses corresponding to the output signal from the detection signal-generating circuit 232 are delivered to the piezoelectric vibrator-driving circuit 208, which applies a given high frequency voltage to the piezoelectric vibrator 221. Ultrasonic vibration is induced in the vibrating member 222. The moving member 223 is rotated or otherwise activated. A pressure-regulating means 224 applies a given pressure to the vibrating member 222 and to the moving member 223. An output means 225 is operated by operating of the moving member 223.

In the structure shown in FIG. 1, the conditions under which the driving pulses are produced can be controlled appropriately without using the stopping pulse storage circuit 210 or the stopping pulse-generating circuit 209 by using an output pulse-generating circuit instead of the output pulse-generating circuit 207.

DETAILED DESCRIPTION OF THE PREFERRED EMBODIMENTS

Figure 1:
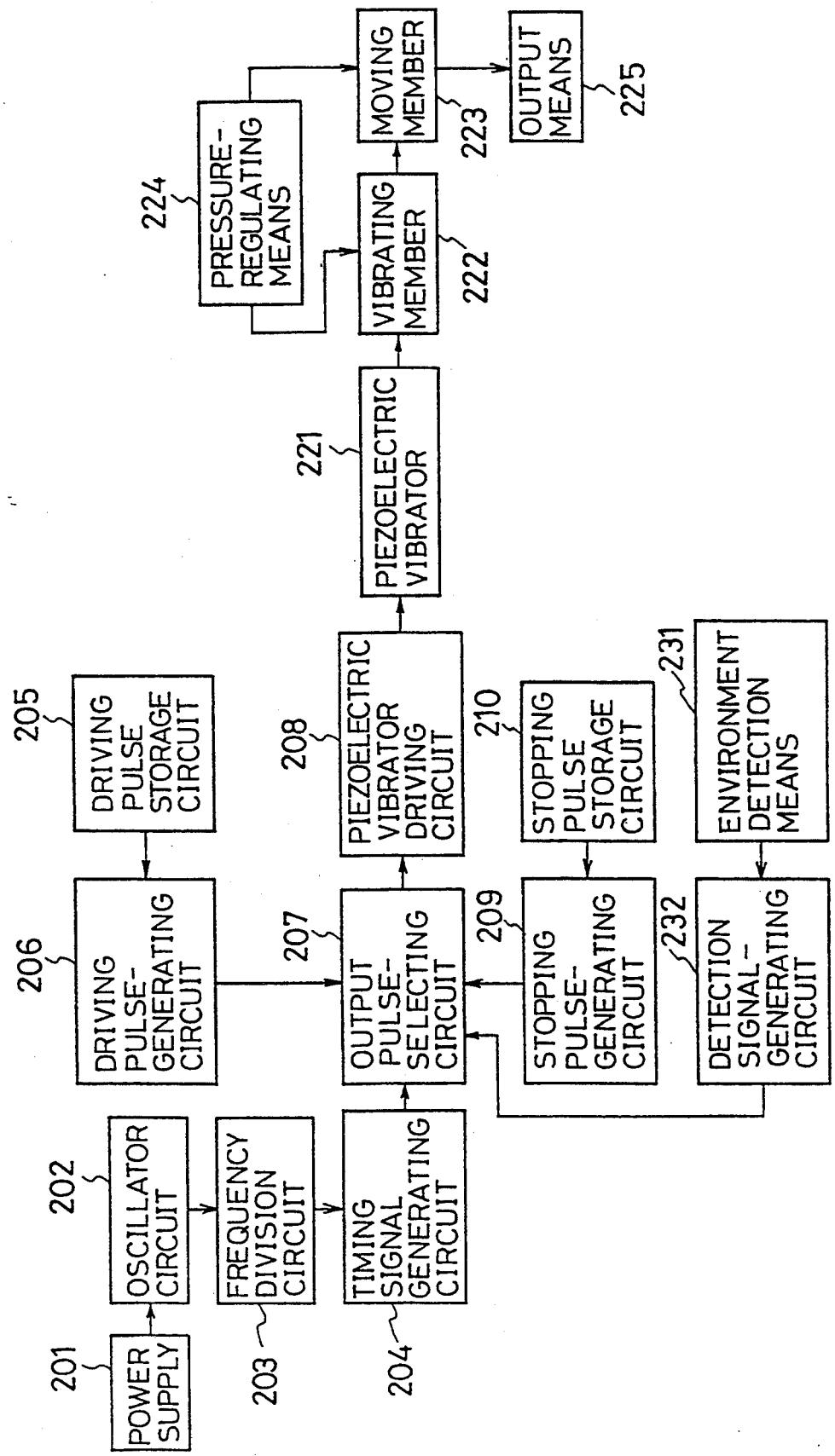
FIG. 1 is a functional block diagram of an electronic apparatus equipped with an ultrasonic motor, the apparatus being fabricated in accordance with the present invention.
Figure 2:
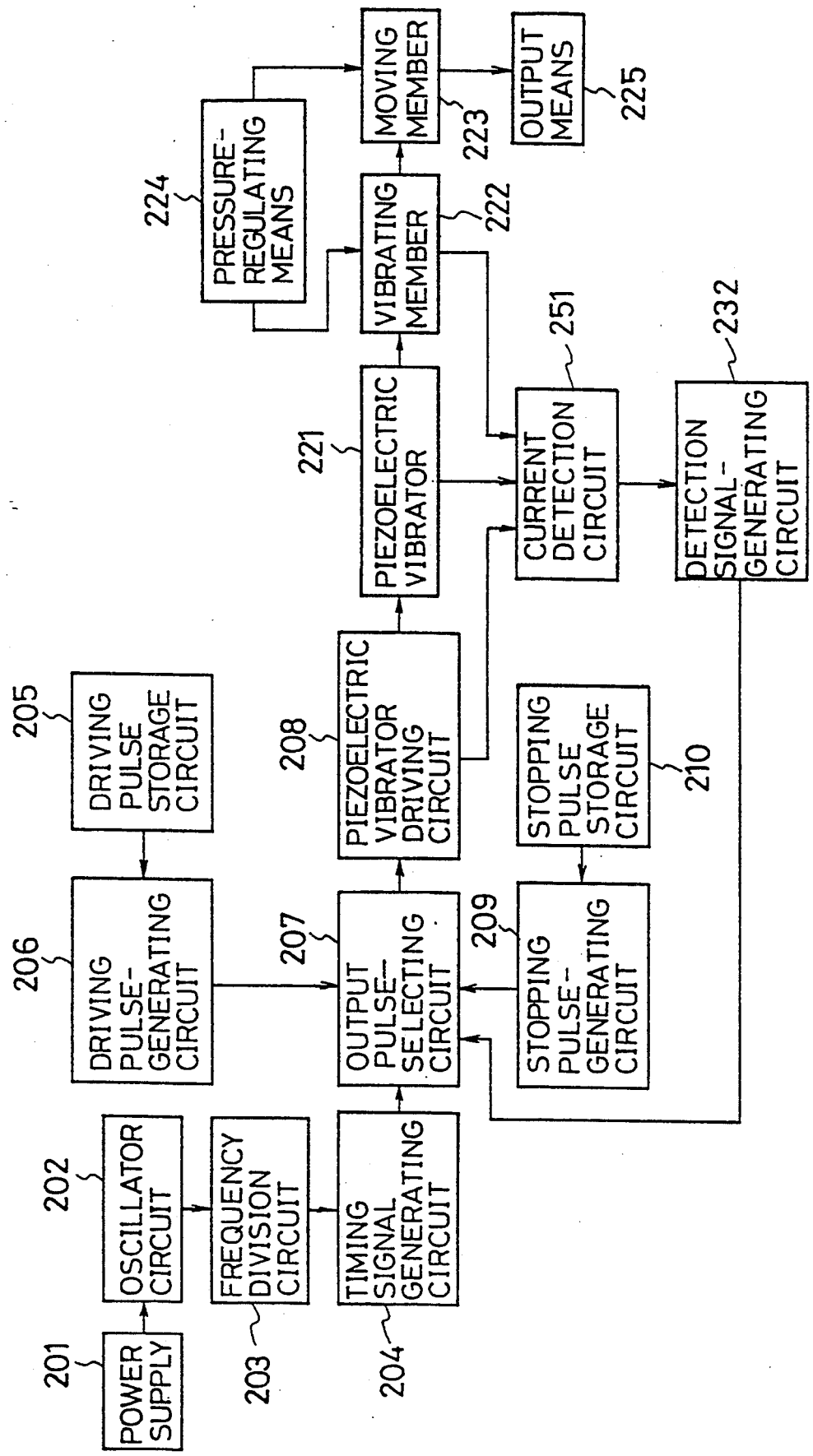
FIG. 2 is a block diagram of the first embodiment of a novel electronic apparatus equipped with an ultrasonic motor.

FIG. 2 is a block diagram of the first embodiment of the novel electronic apparatus equipped with an ultrasonic motor. In the first embodiment of the invention, a current detection circuit 251 is used as the environment detection means.

The current detection circuit 251 is connected with at least one of the piezoelectric vibrator-driving circuit 208, the piezoelectric vibrator 221, and the vibrating member 222. The current detection circuit 251 receives an output signal which varies according to the state of rotation of the ultrasonic motor. When the ultrasonic motor is activated to operate the moving member 223, the output signals from the piezoelectric vibrator-driving circuit 208, the piezoelectric vibrator 221, and the vibrating member 222 are varied.

An electrical current can be used as the output signal. The current detection circuit 251 delivers an output signal according to the detection current. The detection signal-generating circuit 232 delivers a signal corresponding to the detected current.

The driving pulse storage circuit 205 stores driving pulses under various conditions adapted to be produced according to the state of rotation of the moving member 223 of the ultrasonic motor. The driving pulse-generating circuit 206 receives the output signal from the driving pulse storage circuit 205 and produces the driving pulses.

The stopping pulse storage circuit 210 stores stopping pulses under various conditions adapted to be produced according to the state of rotation of the moving member 223 of the ultrasonic motor. The stopping pulse-generating circuit 209 receives the output signal from the stopping pulse storage circuit 210 and delivers the stopping pulses.

The output pulse-selecting circuit 207 receives the output signal from the driving pulse-generating circuit 206 and the output signal from the stopping pulse-generating circuit 209 and delivers such output pulses to the piezoelectric vibrator-driving circuit 208 that corresponding to the output signal from the detection signal-generating circuit 232 according to the state of rotation of the moving member 223. The piezoelectric vibrator-driving circuit 208 applies a given high frequency voltage corresponding to the state of rotation of the moving member 223 to the piezoelectric vibrator 221. Ultrasonic vibration is induced in the vibrating member 222, and to the moving member 223 is rotated.

The pressure-regulating means 224 consists, for example, of a spring, and applies a given pressure to the vibrating member 222 and to the moving member 223.

The output means 225 is operated by operation of the moving member 223. An output shaft, toothed wheel, a vibrating weight, a pointer, a tool, or the like can be used as the output means 225. A moving machine, a blower, a transfer machine, or the like driven by the motor can be realized by using the output shaft or the toothed wheel.

If a vibrating weight is used as the output means 225, a vibrating alarm clock, pager, or the like can be realized. If a pointer is employed as the output means 225, an analog timepiece, a measuring instrument, or the like can be accomplished. If a drill, milling cutter, or other tool us used, various machine tools can be attained.

Figure 3:
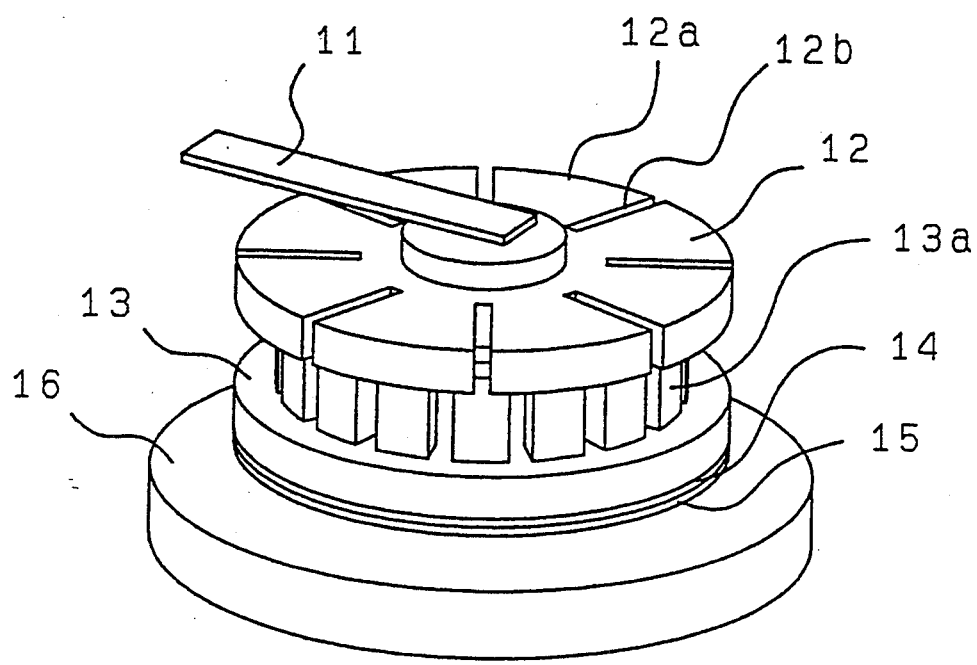
FIG. 3 is a perspective view of a first structure of the ultrasonic motor portion of the first embodiment of the novel electronic apparatus equipped with an ultrasonic motor.

FIG. 3 is a perspective view of a first structure of the ultrasonic motor portion of the first embodiment of the novel electronic apparatus equipped with an ultrasonic motor.

Referring to FIG. 3, a piezoelectric vibrator (A) 14 produces a standing wave for driving the ultrasonic motor. A piezoelectric vibrator (B) 15 produces a standing wave for stopping the motor. A moving member 12 is provided with a plurality of slits 12b adapted for the wave number of the standing wave produced by the piezoelectric vibrator (B) 15. A standing wave is kept produced in a vibrating member 13 while a standing wave is being produced in the piezoelectric vibrator (A) 14. The moving member 12 moves in a direction opposite to the direction in which the standing wave propagates.

The operation of the piezoelectric vibrator (A) 14 is stopped, and a standing wave is generating in the piezoelectric vibrator (B) 15. The position midway between the successive slits in the moving member 12 comes to a stop at the node of the standing wave produced by the piezoelectric vibrator (B) 15. The portion of the moving member 12 in which its weight is concentrated lies midway between the successive slits in the moving member 12.

The position midway between the successive slits in the moving member 12 is rotated close to the node of the standing wave by the driving standing wave produced by the piezoelectric vibrator (A) 14. Thn, the moving member 12 is brought to a stop at the accurate midway position by the stopping wave produced by the piezoelectric vibrator (B) 15.

The vibrating member 13 is fixed to the central shaft (not shown in the drawing), which is in turn mounted to an anchor block 16. The moving member 12 is mounted in such a way that it can be rotated while guided by the central shaft. The pressure-regulating spring 11 presses the moving member 12 against the vibrating member 13 at a given pressure.

Figure 4:
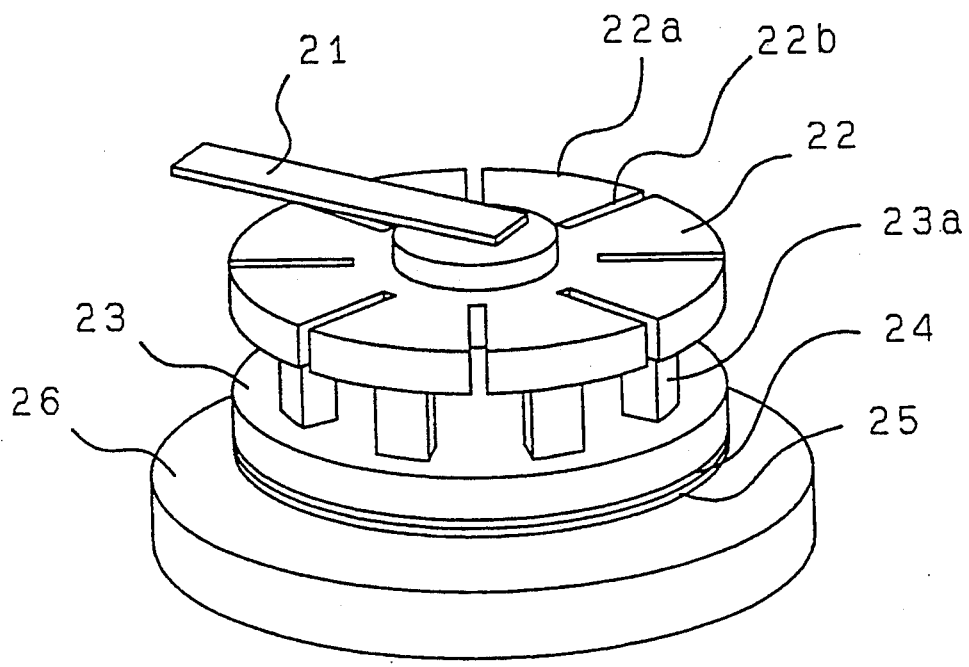
FIG. 4 is a perspective view of a second structure of the ultrasonic motor portion of the first embodiment of the novel electronic apparatus equipped with an ultrasonic motor.

FIG. 4 is a perspective view of a second structure of the ultrasonic motor portion of the first embodiment of the electronic apparatus equipped with an ultrasonic motor.

Referring to FIG. 4, a piezoelectric vibrator (A) 24 produces a driving first standing wave. A piezoelectric vibrator (B) 25 produces a stopping second standing wave The first and second standing waves are $\pi/4$ out of phase.

Figure 5:
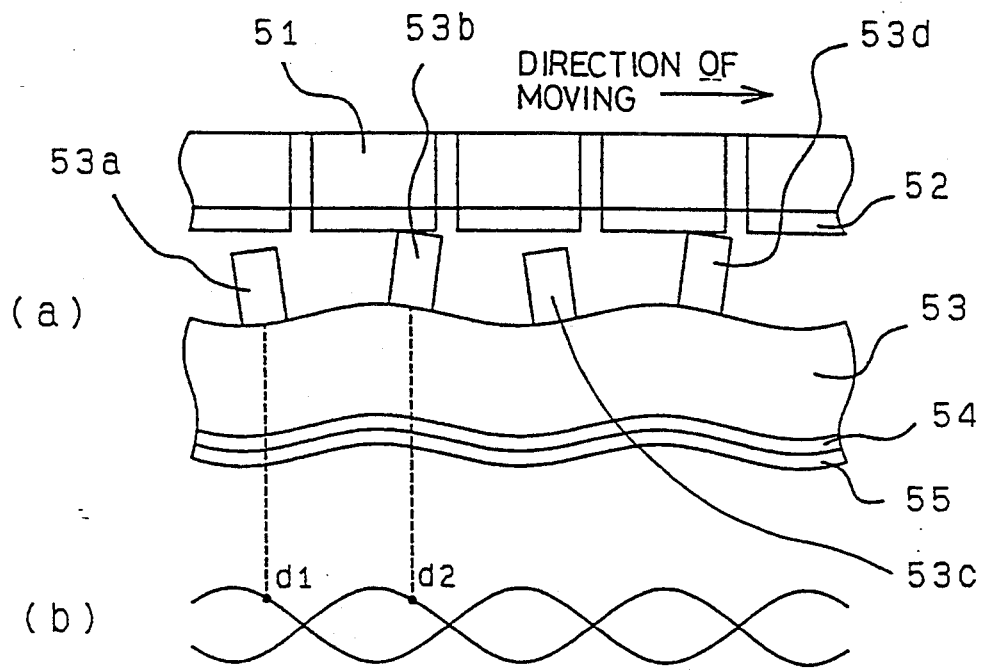
FIG. 5 is a view showing the manner in which the second structure of the ultrasonic motor portion of the first embodiment of the novel electronic apparatus equipped with an ultrasonic motor is being driven.

FIG. 5 illustrates the manner in which the second structure of the ultrasonic motor portion of the first embodiment of the novel electronic apparatus is driven. FIG. 5(a) is a cross-sectional view of the vibrating member and the moving member, and in which the vibrating member is being driven. FIG. 5(b) shows the manner of vibration.

A moving member 51 makes contact with comb-like projections 53b and 53d of a vibrating member 53 via a friction member 52. Piezoelectric vibrators (A) 54 and (B) 55 are rigidly affixed to the vibrating member 53.

The projections 53a and 53b of the vibrating member 53 are located at d1 and d2 between the maximum amplitude portion of the vibration and the node while the piezoelectric vibrator (A) 54 for producing the driving first standing wave is operating. Alternate ones of the comb-like projections 53b and 53d of the vibrating member 53 come into contact with the friction member 52 of the moving member 51. At this time, a rotating force is exerted on the moving member 51. The moving member 51 moves in the direction indicated by the arrow in FIG. 5.

Figure 6:
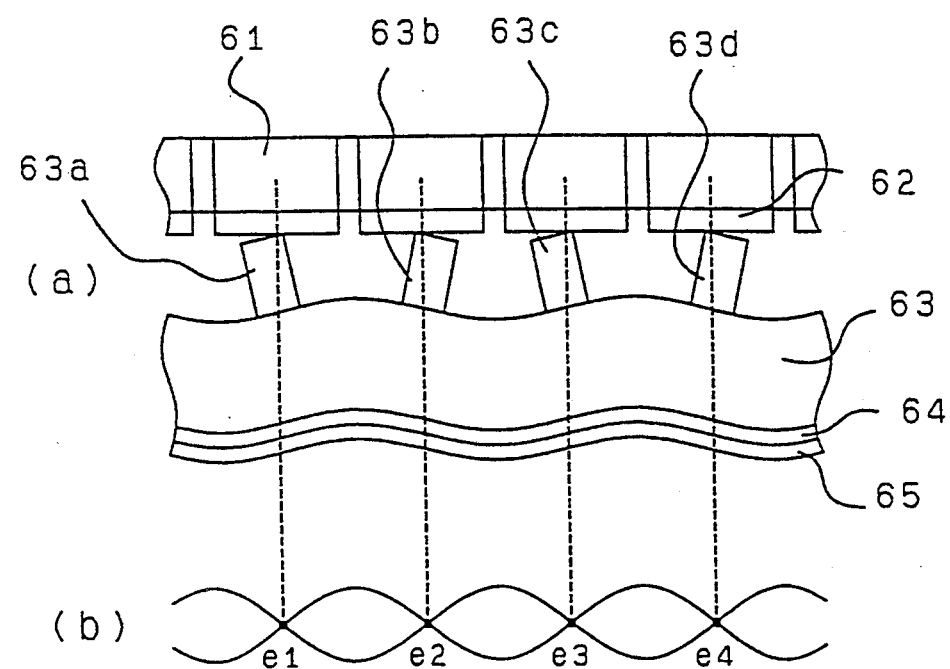
FIG. 6 is a view showing the manner in which the second structure of the ultrasonic motor portion of the first embodiment of the novel electronic apparatus equipped with an ultrasonic motor is at rest.

FIG. 6 is a view of the second structure of the ultrasonic motor portion of the first embodiment of the novel electronic apparatus, showing the stopped condition. FIG. 6(a) is a cross-sectional view of the stopped vibrating member and the moving member. FIG. 6(b) illustrates vibration.

The operation of the driving piezoelectric vibrator 64 is stopped. The operation of the stopping piezoelectric vibrator 65 is started. The nodes of the standing wave are coincident with the comb-like projections of the vibrating member 63. The moving member 61 is provided with slits. The positions located midway between the successive slits in the moving member 61 are brought to a stop at the positions of the nodes e1 to e4 of the standing wave produced by the piezoelectric vibrator. The weight is concentrated in the positions midway between the slits in the moving member 61.

The comb-like projections 63a, 63b, 63c, and 63d of the vibrating member 63 are alternately directed in the same direction and make contact with the friction member 62 of the moving member 61.

The moving member 61 is moved close to the node of the stopping second standing wave by the driving first standing wave. The stopping second standing wave is immediately produced to accurately bring the moving member 61 into the midway position.

The first embodiment of the novel electronic apparatus equipped with an ultrasonic motor has one driving piezoelectric vibrator and one stopping piezoelectric vibrator. A configuration performing the same operation may be realized by one piezoelectric vibrator.

Figure 7:
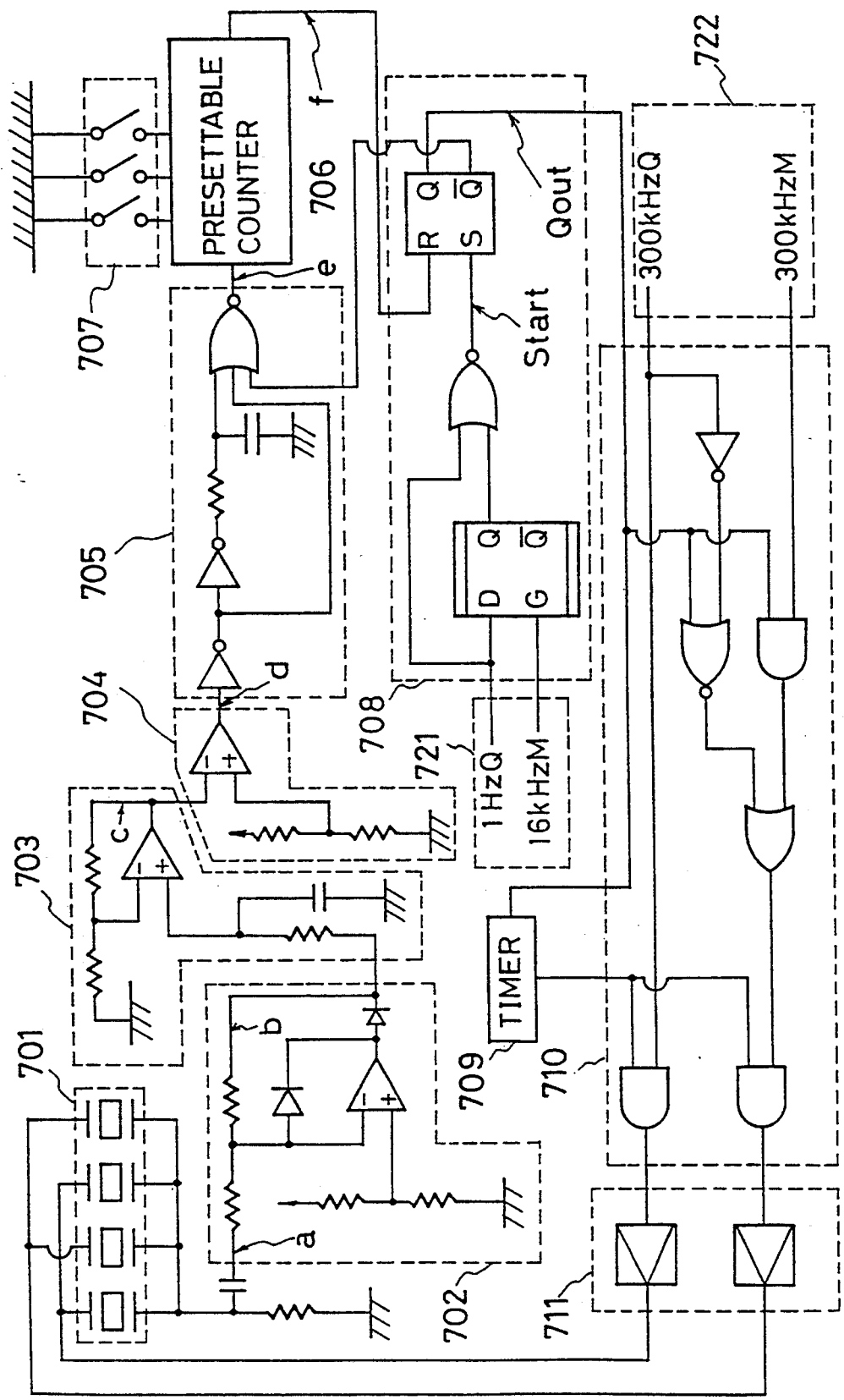
FIG. 7 is a circuit diagram of the first embodiment of the novel electronic apparatus equipped with an ultrasonic motor.

FIG. 7 is a circuit diagram of the first embodiment of the novel electronic apparatus equipped with an ultrasonic motor.

A rectification amplifier circuit 702 receives, rectifies, and amplifies the output signal from a piezoelectric vibrator 701. A smoothing circuit 703 receives the output signal from the rectification circuit 702 and smooths the output waveform. A decision circuit 704 compares the output signal from the smoothing circuit 703 with a predetermined voltage value Vcomp. A rising detection circuit 705 receives the output signal from the decision circuit 704 and detects a rising signal.

A presettable counter 706 sets the number of the driving signals delivered by means of a switch 707, the driving signals taking the form of traveling waves. A driving pulse-generating circuit 708 receives the output signals of 1 HzQ and 16 kHzM from a frequency division circuit 721, and a controls the generation of the driving pulses.

A timer 709 sets the time for which the output signals of traveling and standing waves are produced and the time for which the output signals are not produced. An output pulse-selecting circuit 710 receives signals of 300 kHzQ and 300 kHzM from a pulse-generating circuit 722 and selectively produces output signals of traveling and standing waves.

The Q and M signals are 90 degrees out of phase. Different values are set for the signals of 300 kHzQ and 300 kHzM produced from the pulse-generating circuit 722 according to the structure and specifications of the ultrasonic motor. A piezoelectric vibrator-driving circuit 711 receives the output signal of traveling or standing wave and produces an output signal for driving the piezoelectric vibrator 701.

Figure 8:
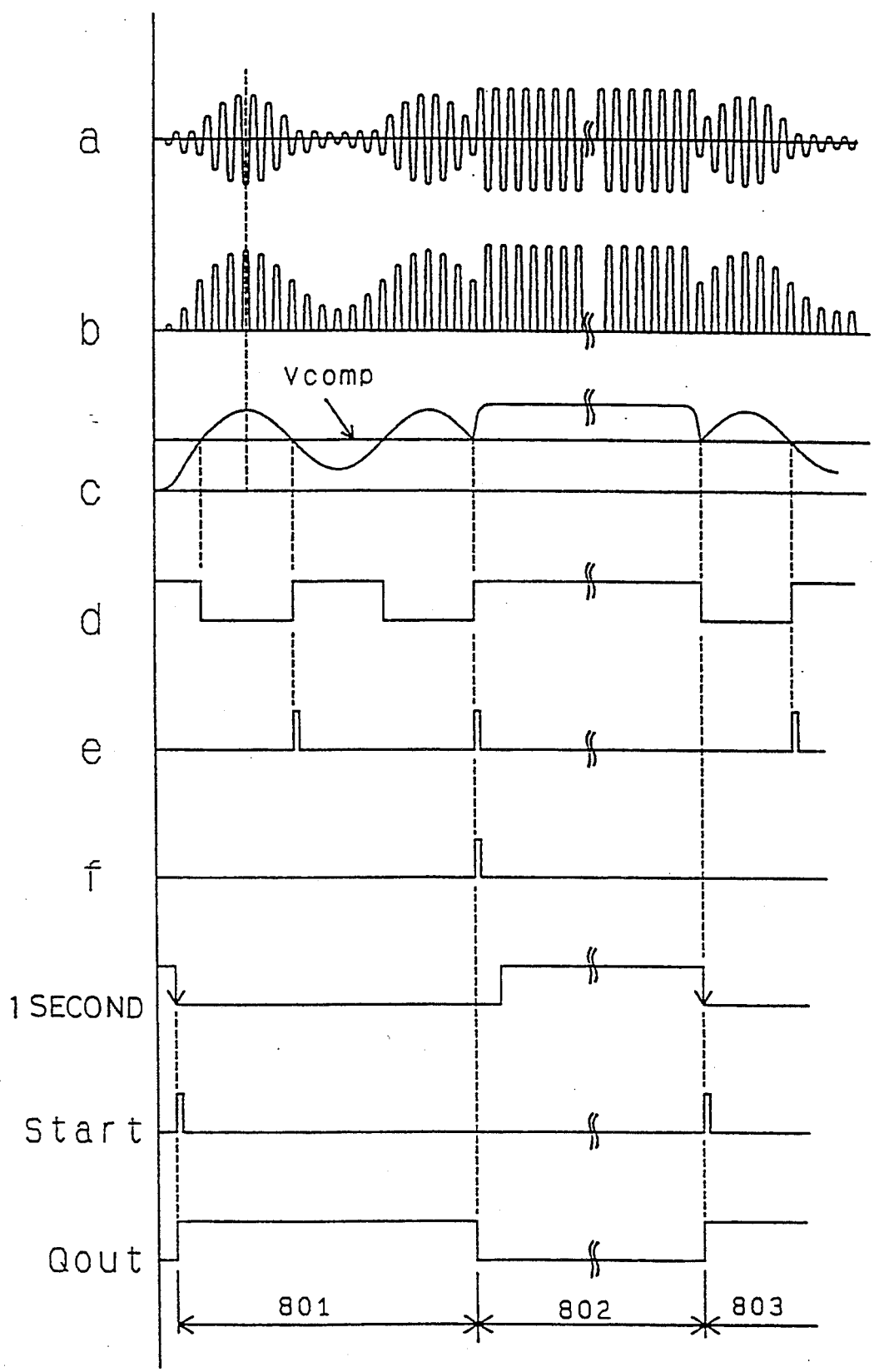
FIG. 8 is a time chart illustrating the first embodiment of the novel ultrasonic apparatus equipped with an ultrasonic motor.

FIG. 8 is a time chart illustrating the first embodiment of the novel electronic apparatus equipped with an ultrasonic motor. In FIG. 8, "a", "b", "c", "d", "e", "f", "Start", and "Qout" schematically show the waveforms of signals produced at various points having the same designations an in the circuit diagram of the first embodiment of the novel ultrasonic motor equipped with an ultrasonic motor shown in FIG. 7.

The output signal "a" from the piezoelectric vibrator 701 is rectified and amplified, thus producing the signal "b". The signal "b" is smoothened, producing the signal "c". The signal "c" is compared with the preset voltage value Vcomp. The signal "c" is compared with the voltage value Vcomp, thus producing the signal "d". At the timing of the signal "d", the signal "e" to be applied to the presettable counter 706 is produced.

The presettable counter 706 is caused to produce the signal "f" at given timing by operation of the switch 707. The signal "Start" is delivered in response to the signal "f" and a reference signal of 1 second. The "Qout" signal is delivered in response to the signal "f" and the signal "Start". The output of the traveling and standing waves is controlled at the timing illustrated in FIG. 8 in this way.

A traveling wave is produced during period 801 of FIG. 8. A standing wave is produced during period 802. Again, a traveling wave is produced during period 803. The periods 801, 802, and 803 are set to desired values by the timer 709. A pause period in which neither traveling wave nor standing wave is produced can be established between the periods 802 and 803.

An electronic apparatus equipped with an ultrasonic motor whose output shaft is rotated through a predetermined angle for a given time can be realized by setting the values in the timer to various values.

Figure 9:
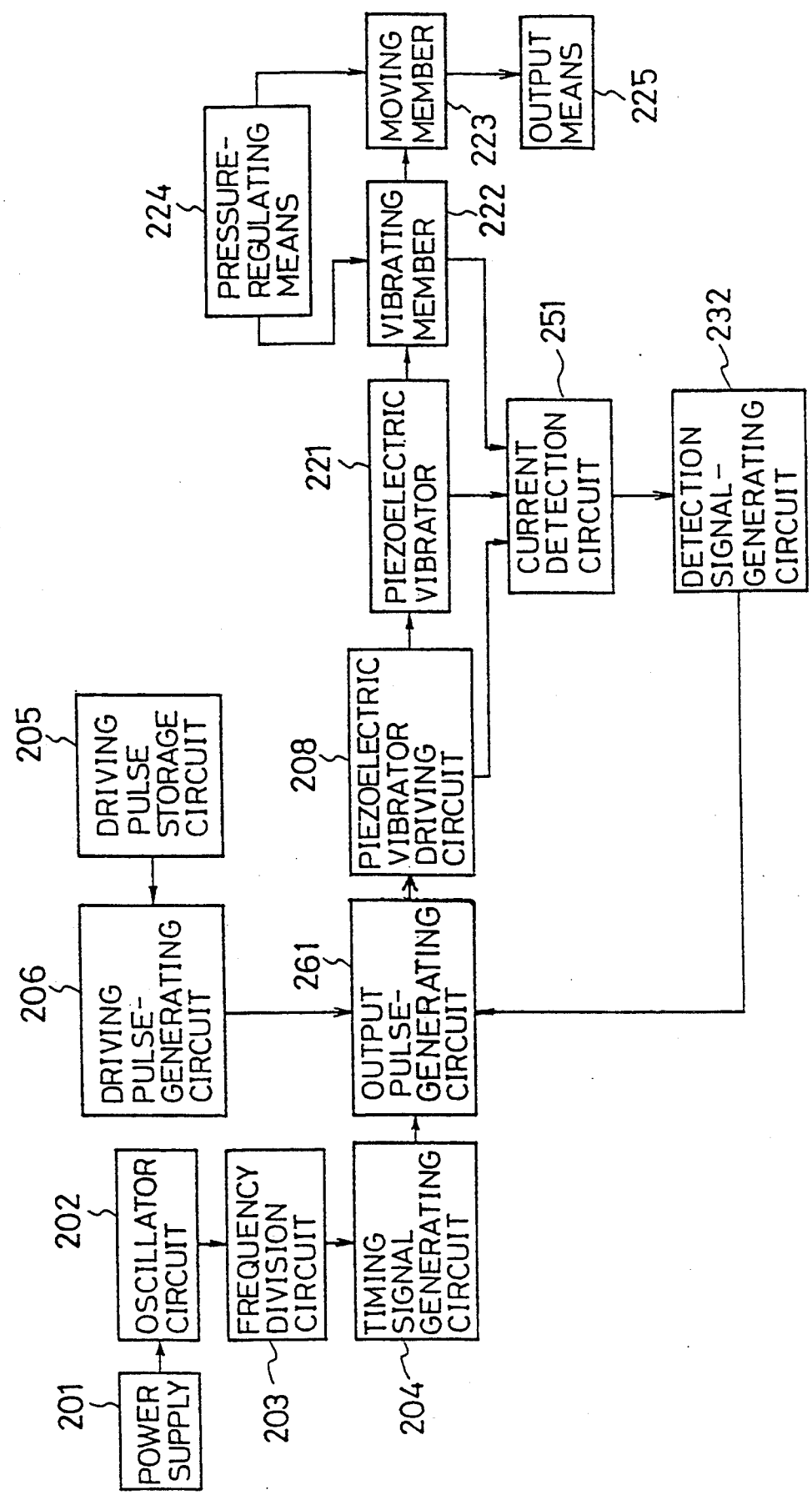
FIG. 9 is a block diagram of the second embodiment of the novel ultrasonic apparatus equipped with an ultrasonic motor.

FIG. 9 is a block diagram of the second embodiment of the novel electronic apparatus equipped with an ultrasonic motor. The second embodiment of the invention uses a current detection circuit 251 as the environment detection means. A stopping pulse-generating circuit is not used.

The current detection circuit 251 is connected with at least one of a piezoelectric vibrator-driving circuit 208, a piezoelectric vibrator 221, and a vibrator member 222. The current detection circuit 251 produces an output signal which varies according to the state of rotation of the ultrasonic motor. The ultrasonic motor operates, activating a moving member 223. This varies the output signals from the piezoelectric vibrator-driving circuit 208, the piezoelectric vibrator 221, and the vibrating member 222.

An electrical current can be used as the output signal. The current detection circuit 251 produces an output signal corresponding to the detected current. A detection current-generating circuit 232 produces an output signal corresponding to the detecting current.

A driving pulse storage circuit 205 stores driving pulses under various conditions adapted to be produced according to the state of rotation of the moving member 223 of the ultrasonic motor. A driving pulse-generating circuit 206 receives the output signal from the driving pulse storage circuit 205 and produces driving pulses.

An output pulse-generating circuit 261 receives the output signal from the detection signal-generating circuit 232 and produces or ceases to produce driving pulses according to the state of the rotation of the ultrasonic motor.

The driving pulses can take the form of either traveling wave or standing wave.

Figure 10:
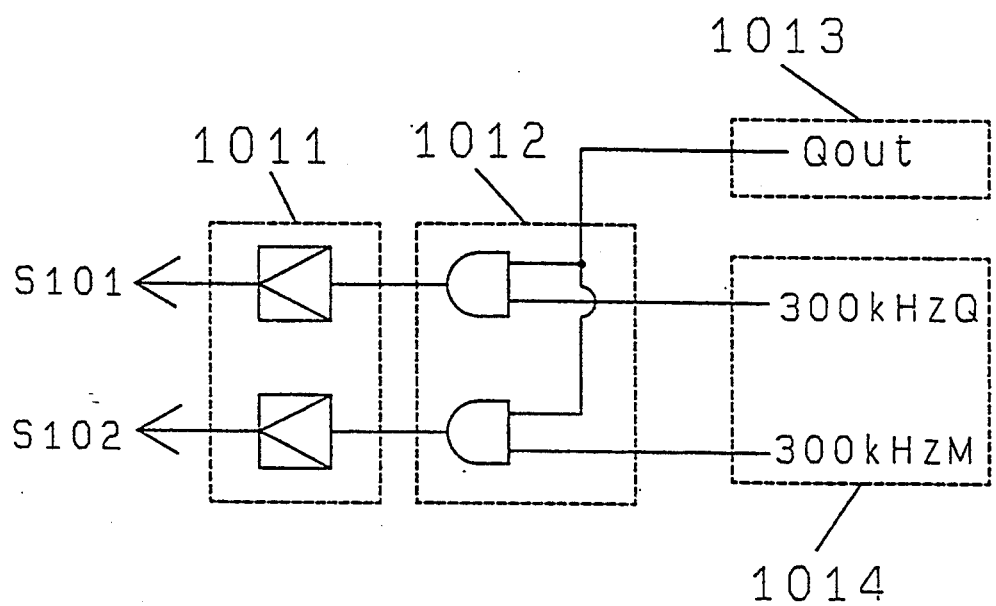
FIG. 10 is a view showing a part of the circuit of the second embodiment of the novel ultrasonic apparatus equipped with an ultrasonic motor.

FIG. 10 is a diagram illustrating a part of the circuit of the second embodiment of the novel electronic apparatus equipped with an ultrasonic motor. In FIG. 10, only the differences with the circuit diagram of FIG. 7 of the first embodiment of the novel electronic apparatus equipped with an ultrasonic motor are shown.

An output pulse-generating circuit 1012 receives the output signal from a driving pulse-generating circuit 1013, receives signals of 300 kHzQ and 300 kHzM delivered from a pulse-generating circuit 1014, and controls the supply and stoppage of output pulses taking the form of traveling wave or standing wave.

A piezoelectric vibrator-driving circuit 1011 receives the output signal in the form of traveling or standing wave and produces output signals S101 and S102 for driving the piezoelectric vibrator.

Figure 11:
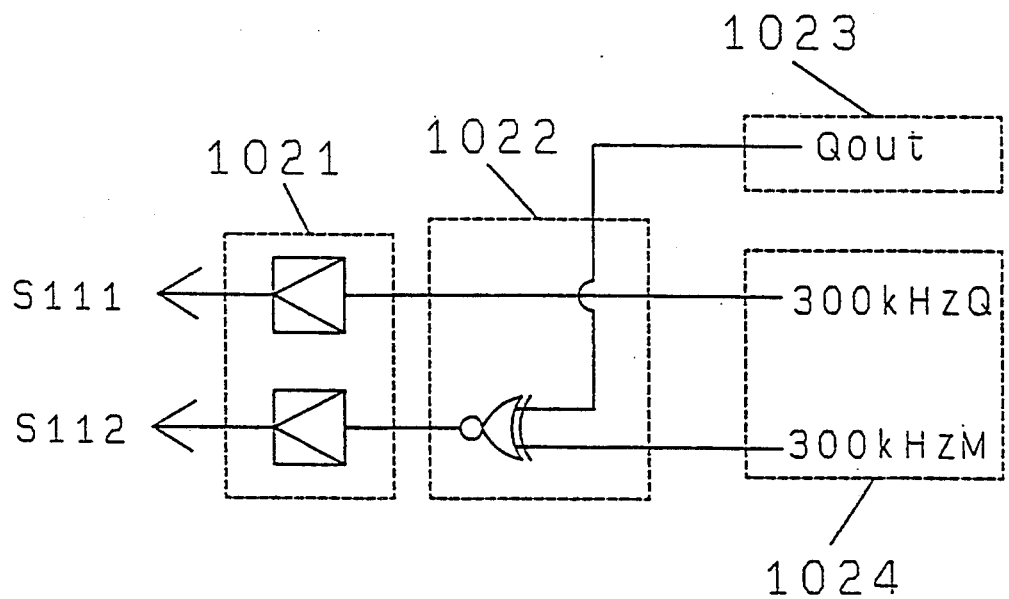
FIG. 11 is a view showing a part of the circuit of the third embodiment of the novel ultrasonic apparatus equipped with an ultrasonic motor.

FIG. 11 is a diagram showing a part of the circuit of the third embodiment of the novel electronic apparatus equipped with an ultrasonic motor. In FIG. 11, only the differences with the circuit diagram of FIG. 7 of the first embodiment of the novel electronic apparatus equipped with an ultrasonic motor are shown.

The third embodiment of the present invention uses a current detection circuit 251 as the environment detection means.

An output pulse-selecting circuit 1022 receives the output signal from a driving pulse-generating circuit 1023, receives signals of 300 kHzQ and 300 kHzM from a pulse-generating circuit 1024 and selectively produces output signals of traveling wave and standing wave.

A piezoelectric vibrator-driving circuit 1011 receives the output signal of traveling wave or standing wave and produces output signals S111 and S112 for driving the piezoelectric vibrator.

Figure 12:
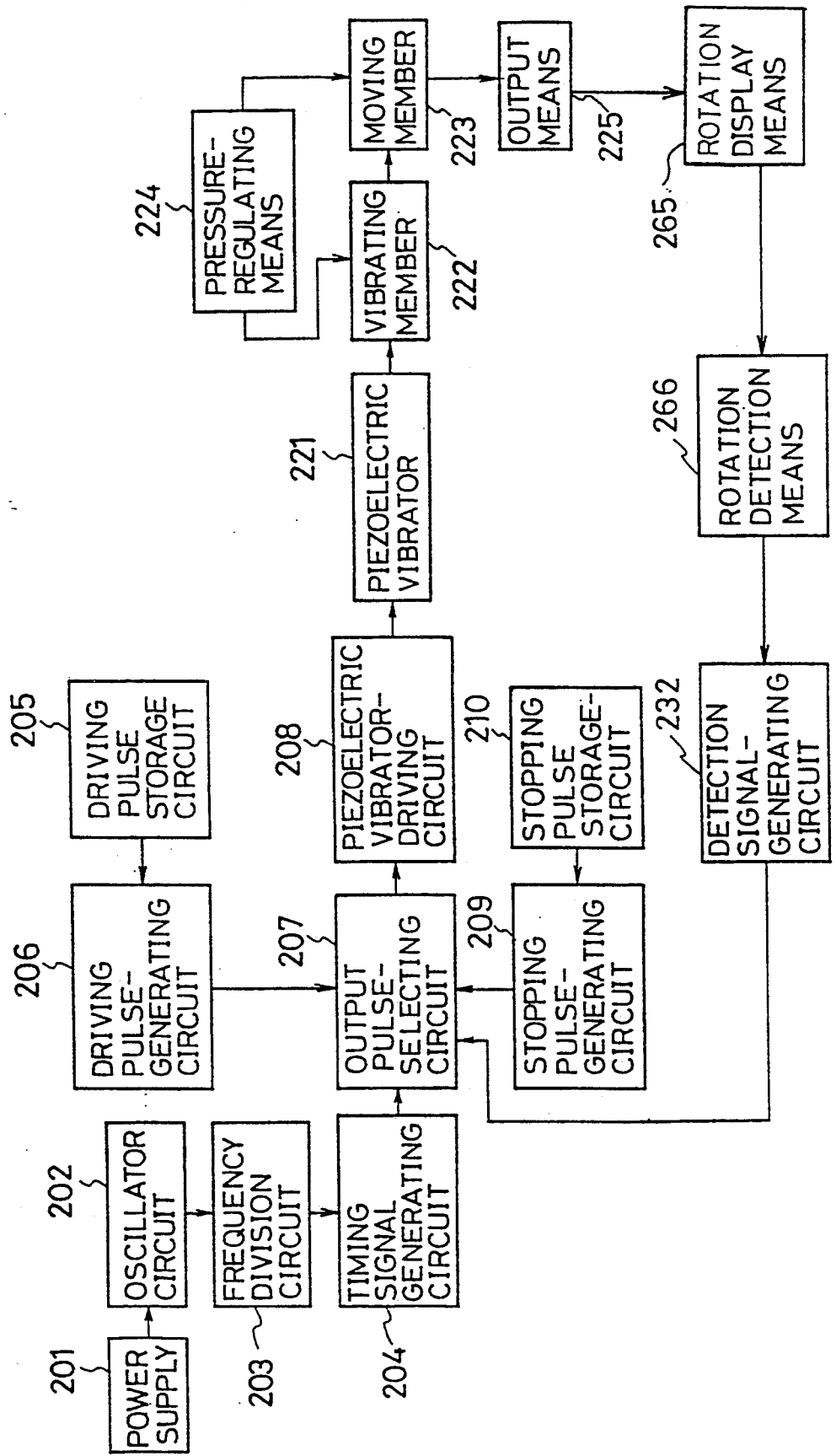
FIG. 12 is a block diagram of the fourth embodiment of the novel ultrasonic apparatus equipped with an ultrasonic motor.

FIG. 12 is a block diagram of the fourth embodiment of the novel electronic apparatus equipped with an ultrasonic motor. The fourth embodiment of the invention utilizes a rotation display means 265 and a rotation detection means 266 as the environment detection means.

The rotation display means 265 is operated by operation of an output means 225. A rotation detection means 266 produces a signal corresponding to the state of operation of a rotation display means 265.

The principle of the rotation display means 265 and the rotation detection means 266 can make use of light, magnetism, capacitance, or the like.

The output signal can take the form of the voltage or the like. The detection signal-generating circuit 232 produces an output signal corresponding to the detected voltage or the like.

The driving pulse storage circuit 205 stores driving pulses under various conditions adapted to be produced according to the state of rotation of the moving member 223 of the ultrasonic motor. The driving pulse-generating circuit 206 receives the output signal from the driving pulse storage circuit 205 and produces driving pulses.

The stopping pulse storage circuit 210 stores stopping pulse under various conditions adapted to be produced according to the state of rotation of the moving member 223 of the ultrasonic motor. The stopping pulse-generating circuit 209 receives the output signal from the stopping pulse storage circuit 210 and delivers the stopping pulses.

The output pulse-selecting circuit 207 receives the output signal from the detection signal-generating circuit 232 and produces or ceases to produce driving pulses or stopping pulses according to the state of rotation of the ultrasonic motor.

The driving pulses can take the form of either traveling wave or standing wave.

Figure 13:
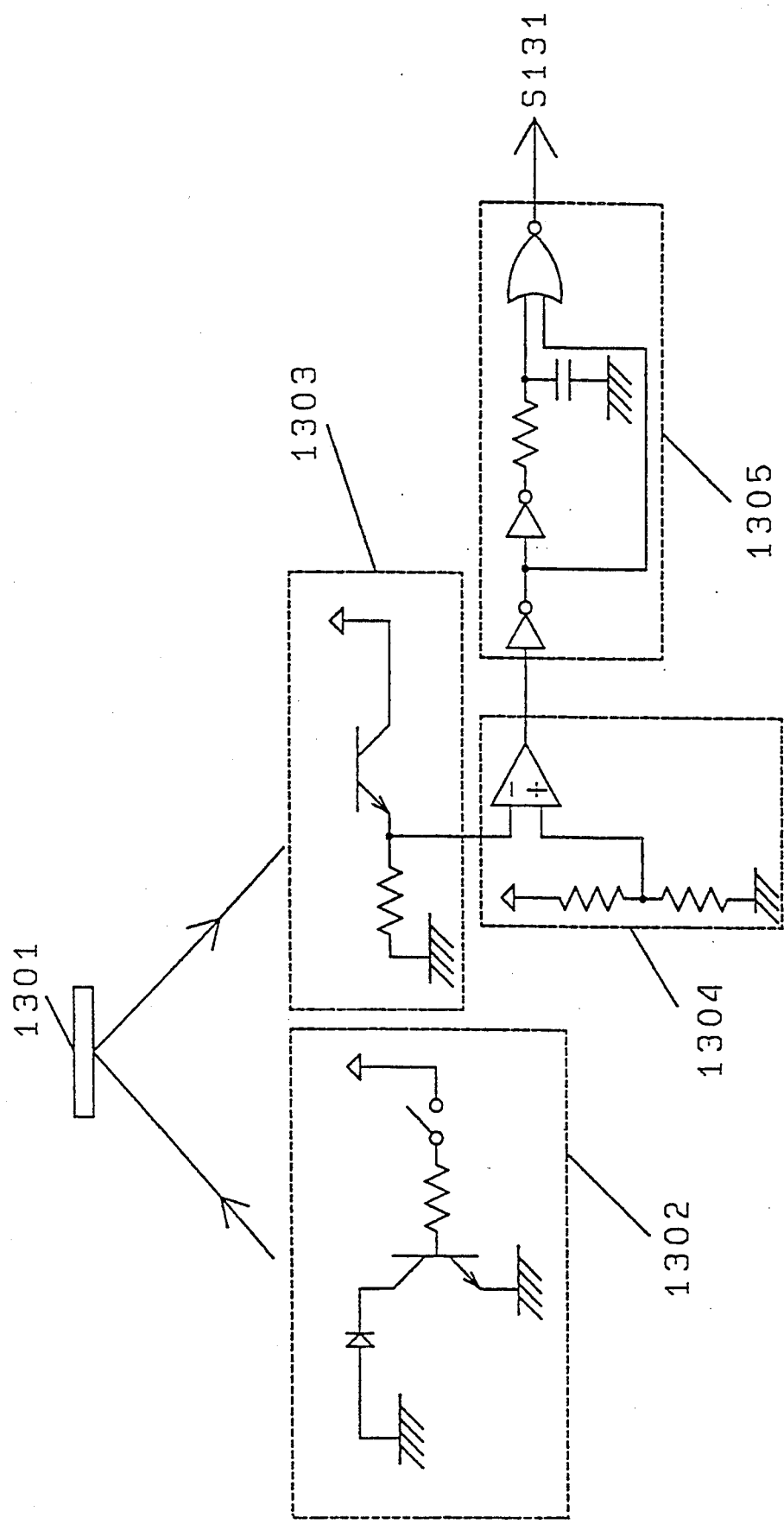
FIG. 13 is a view showing a part of the circuit of the fourth embodiment of the novel ultrasonic apparatus equipped with an ultrasonic motor.

FIG. 13 is a diagram showing a part of the circuit of the fourth embodiment of the novel electronic apparatus equipped with an ultrasonic motor. In FIG. 13, only the differences with the circuit diagram of FIG. 7 of the first embodiment of the novel electronic apparatus equipped with an ultrasonic motor are shown.

A light-emitting circuit 1302 having light-emitting devices such as light-emitting diodes emits given light rays toward a moving member. A plurality of reflecting mirrors 1301 are mounted on the outer periphery of the moving member so as to be equally spaced from each other. A reflector such as mirror which well reflects given light rays is used as each reflecting mirror 1301. Instead of mounting the reflectors on the moving member, the outer surface of the moving member may be shaped or finished so as to reflect light rays, provided that the moving member is provided with slits.

An incident circuit 1303 having light-receiving devices such as photodiodes or transistors receives the light ray reflected from the reflecting mirrors 1301 and produces an output signal. An incident signal comparison circuit 1304 compares the signal delivered from the incident circuit with a given signal.

The detection signal-generating circuit 1305 produces a signal S131 corresponding to the state of rotation of the moving member 223 to the output pulse-selecting circuit 207.

The output pulse-selecting circuit 1022 produces or ceases to produce driving pulses having appropriate details according to the state of rotation of the ultrasonic motor. The output pulse-selecting circuit 1022 selectively produces output signals of traveling wave and standing wave.

Figure 14:
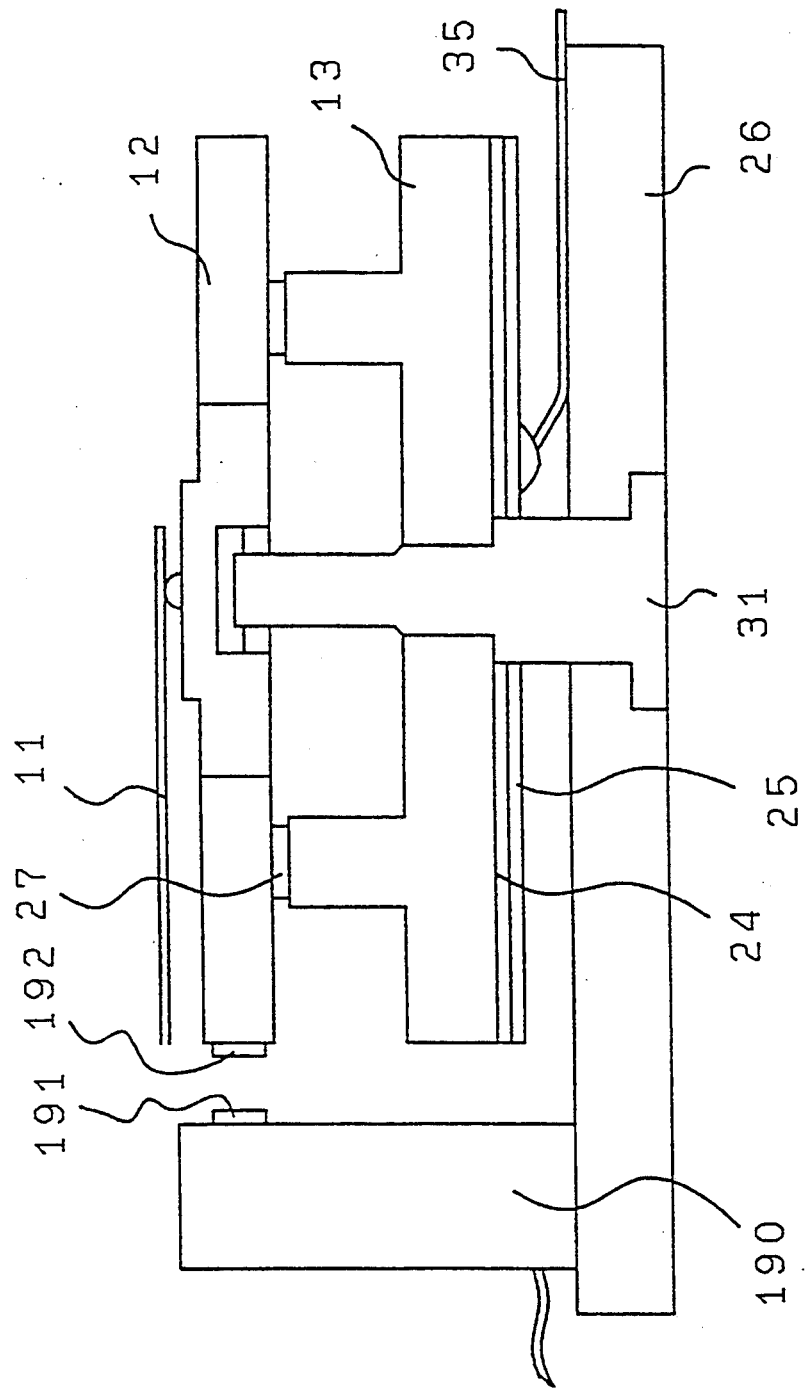
FIG. 14 is a cross-sectional view of the ultrasonic motor portion of the fourth embodiment of the novel ultrasonic apparatus equipped with an ultrasonic motor.

FIG. 14 is a cross-sectional view of the ultrasonic motor of the fourth embodiment of the novel electronic apparatus equipped with the ultrasonic motor. As shown in FIG. 14, a central shaft 31 is rigidly fixed to an anchor block 26. A vibrating member 13 is firmly mounted to the central shaft 31. Piezoelectric vibrator 24 and piezoelectric vibrator 25 are adhesively bonded to the underside of the vibrating member 13. The piezoelectric vibrator 24 and piezoelectric vibrator 25 are polarized into a given shape. A lead wire 35 connects the electrode patterns on the piezoelectric vibrator 24 and piezoelectric vibrator 25 with a circuit for driving the piezoelectric vibrator.

The vibrating member 13 is provided with a plurality of comb-like projections. A moving member 12 is brought into contact with the comb-like projections of the vibrating member 13 via friction member 27. The moving member 12 is rotatably mounted to the central shaft 31. A pressure-regulating spring 11 presses the moving member 12 against the comb-like projections of the vibrating member 13.

A plurality of reflecting mirrors 192 are mounted to the outer periphery of the moving member 12 so as to be regularly spaced from each other. A rotation detection device 191 having light-emitting devices and light-receiving devices is mounted to a device mount 190. The output signal from the rotation detection device 191 is applied to a detection signal-generating circuit 232.

The circuit for driving the piezoelectric vibrators applies a given high frequency voltage to the piezoelectric vibrator 24 and piezoelectric vibrator 25. Ultrasonic vibration is induced in the vibrating member 13. The moving member 12 is rotated via the frictional force of the friction member 27.

The state of rotation of the moving member 12 is detected by the rotation detection device 191, and the rotation is controlled.

Figure 15:
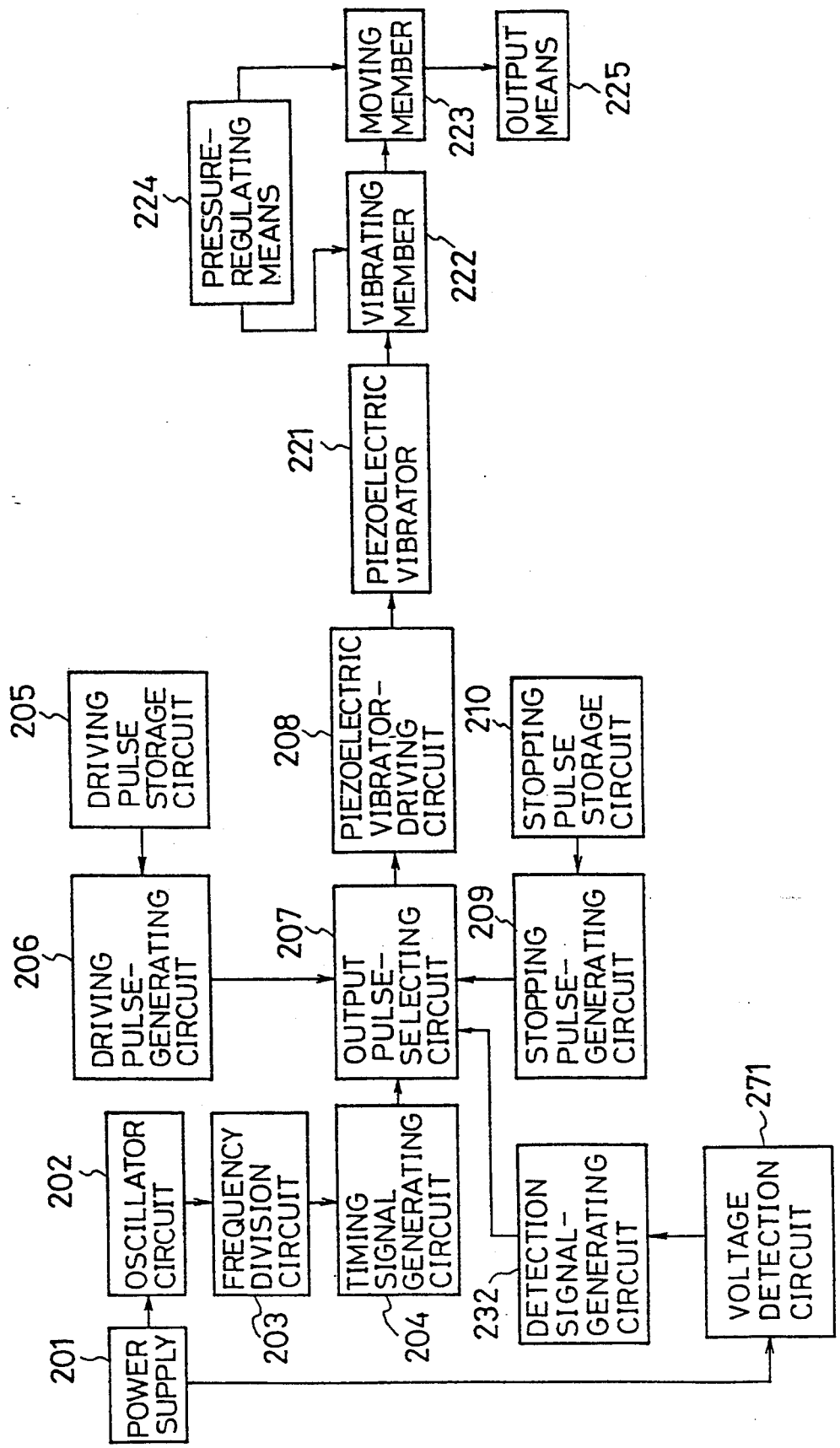
FIG. 15 is a block diagram of the fifth embodiment of the novel ultrasonic apparatus equipped with an ultrasonic motor.

FIG. 15 is a block diagram of the fifth embodiment of the novel electronic apparatus equipped with an ultrasonic motor. The fifth embodiment of the invention uses a voltage detection circuit 271 for detecting the supply voltage as the environment detection means.

A battery or the like is used as the power supply 201. The voltage detection circuit 271 detects the voltage of the power supply 201. The detected output signal can take the form of a voltage or the like. The detection signal-generating circuit 232 produces an output signal corresponding to the detected voltage or the like.

The driving pulse storage circuit 205 stores driving pulses under various conditions adapted to be produced according to the state of rotation of the moving member 223 of the ultrasonic motor. The driving pulse-generating circuit 206 receives the output signal from the driving pulse storage circuit 205 and produces driving pulses.

The stopping pulse storage circuit 210 stores stopping pulses under various conditions adapted to be produced according to the state of rotation of the moving member 223 of the ultrasonic motor. The stopping pulse-generating circuit 209 receives the output signal from the stopping pulse storage circuit 210 and delivers the stopping pulses.

The output pulse-selecting circuit 207 receives the output signal from the detection signal-generating circuit 232 and produces or ceases to produce appropriate driving pulses or stopping pulses according to the state of rotation of the ultrasonic motor.

The driving pulses can take the form of either traveling wave or standing wave.

Figure 16:
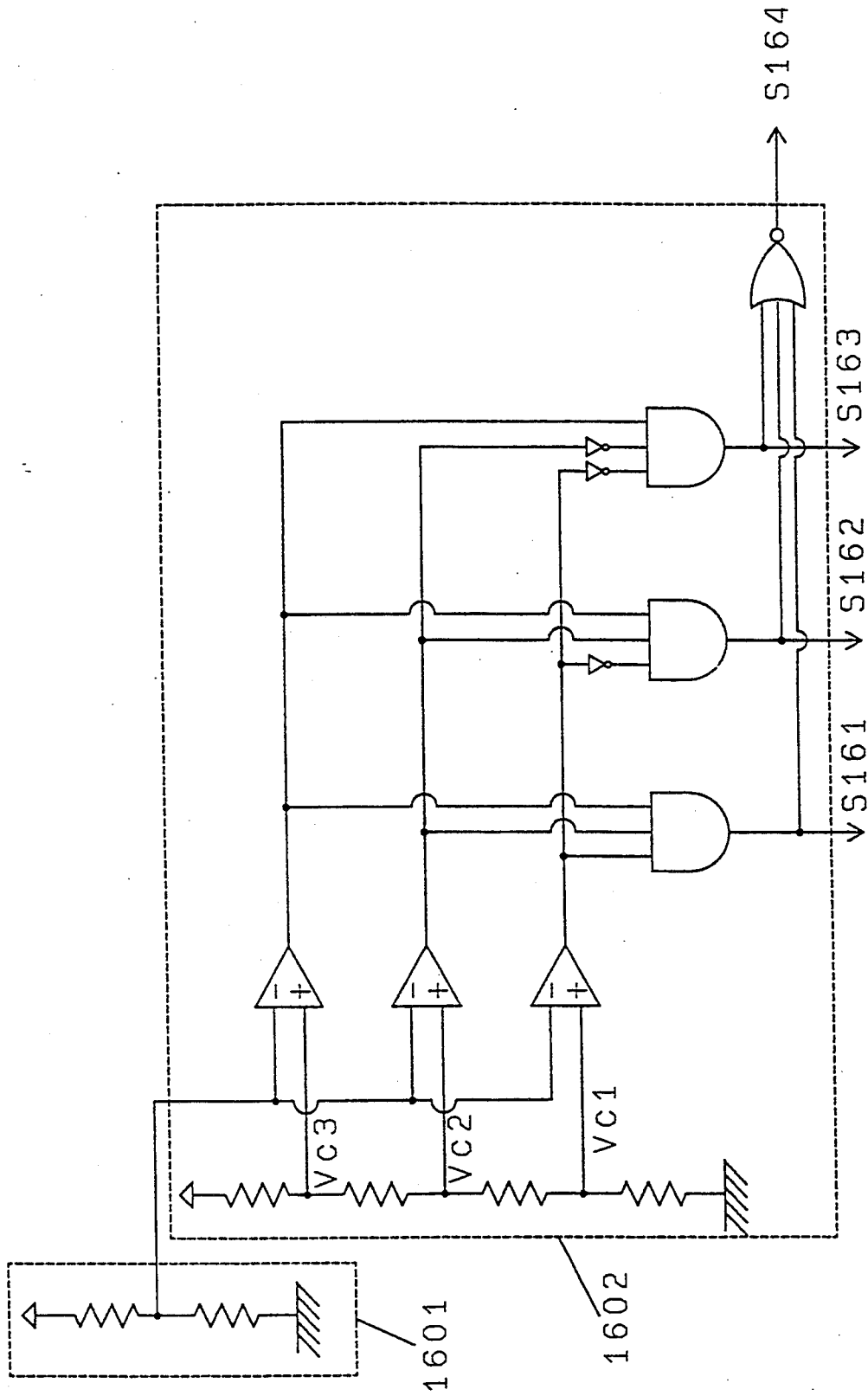
FIG. 16 is a view showing a part of the circuit of the fifth embodiment of the novel ultrasonic apparatus equipped with an ultrasonic motor.

FIG. 16 is a diagram showing a part of the circuit of the fifth embodiment of the novel electronic apparatus equipped with an ultrasonic motor. In FIG. 16, only the differences with the circuit diagram of FIG. 7 of the first embodiment of the novel electronic apparatus equipped with an ultrasonic motor are shown.

A voltage detection circuit 1601 detects the voltage of a power supply 201. The detected voltage signal can take the form of a voltage or the like. A detection signal-generating circuit 1602 produces an output signal corresponding to the detected voltage. The detection signal-generating circuit 1602 compares the voltage of the power supply 201 with three reference voltages, for example 2.0 V, 2.5 V, and 3.0 V, and produces an output signal corresponding to the voltage range. For example, four output signals S161, S162, S163, and S164 are delivered according to the degree of the voltage of the power supply 201.

Various reference voltages can be previously set according to the specifications of the power supply and of the ultrasonic motor.

Figure 17:
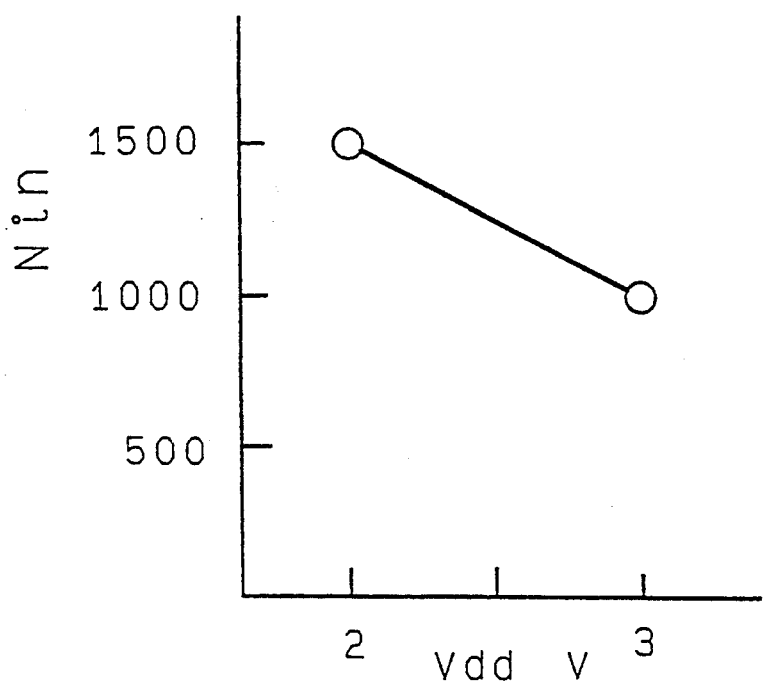
FIG. 17 is a graph showing the relation of the number of input pulses needed to cause the moving body to make one resolution to the supply voltage about the driving pulses in the fifth embodiment of the novel electronic apparatus equipped with an ultrasonic motor.

FIG. 17 is a graph showing the relation of the number of input pluses needed to cause the moving member to make one resolution to the supply voltage about the driving pulses in the fifth embodiment of the novel electronic apparatus equipped with an ultrasonic motor.

The values shown in FIG. 17 were obtained from a sample according to the invention given below. The input wave is a traveling wave. The number of oscillating waves is 3.
- vibrating member
- diameter: 10 mm, thickness: 0.9 mm.
- material: aluminum alloy
- pressure applied to the moving member: 10 g
- input frequency: 100 kHz
- number of revolutions of output shaft: 1
- ambient temperature: 25 ° C.

As shown in FIG. 17, when the supply voltage Vdd is 2.0 V, the number Nin of the input pulses needed to rotate the moving member once is 1500. When the supply voltage Vdd is 3.0 V, the number Nin of the input pulses needed to rotate the moving member once is 1000. In this way, the number of input pulses Nin needed to rotate the moving member once under various conditions is empirically found.

The relations between the supply voltage Vdd and the number Nin of input pulses needed to rotate the moving member once under various conditions are stored in the driving pulse storage circuit in the form of numerical data or relational formulas.

Figure 18:
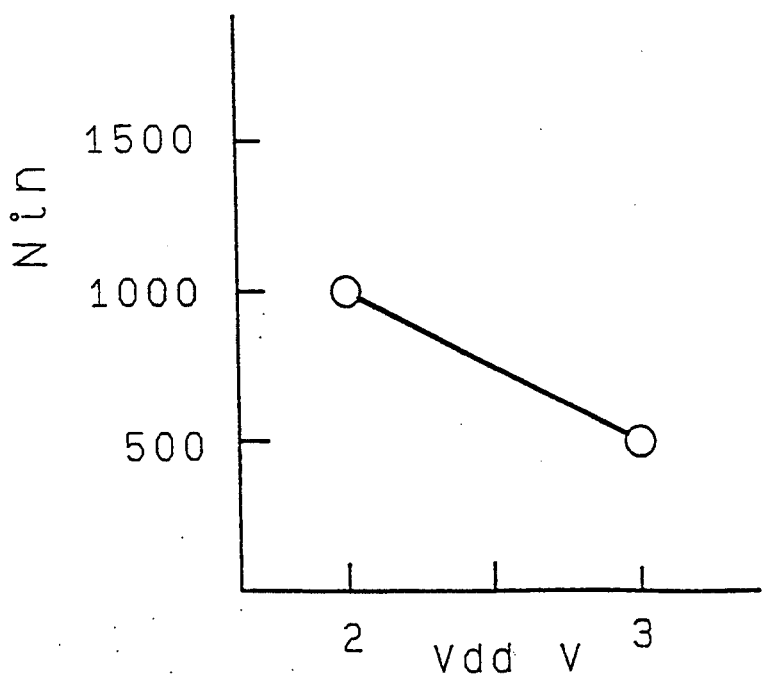
FIG. 18 is a graph showing the relation of the number of input pulses needed to stop the moving body to the supply voltage about the stopping pulses in the fifth embodiment of the novel electronic apparatus equipped with an ultrasonic motor.

FIG. 18 is a graph showing the relation of the number of input pulses needed to stop the moving member to the supply voltage about the stopping pulses in the fifth embodiment of the novel electronic apparatus equipped with an ultrasonic motor.

The values shown in FIG. 18 were obtained from a sample having the same specifications as in FIG. 17. However, the input wave is a standing wave.

As shown in FIG. 18, when the supply voltage Vdd is 2.0 V, the number Nin of the input pulses needed to bring the moving member to a stop is 1000. When the supply voltage Vdd is 3.0 V, the number Nin of input pulses needed to bring the moving member to a stop is 500. In this way, the number of input pulses Nin needed to stop the moving member under various conditions is empirically found.

The relations of the supply voltage Vdd to the number of input pulses Nin needed to stop the moving member under various conditions are stored in the stopping pulse storage circuit in the form of numerical data or relational formulas. Furthermore, the timing at which the driving pulses are produced and the pause intervals between the driving pulses and the stopping pulses are stored in the driving pulse storage circuit or in the stopping pulse storage circuit.

Figure 19:
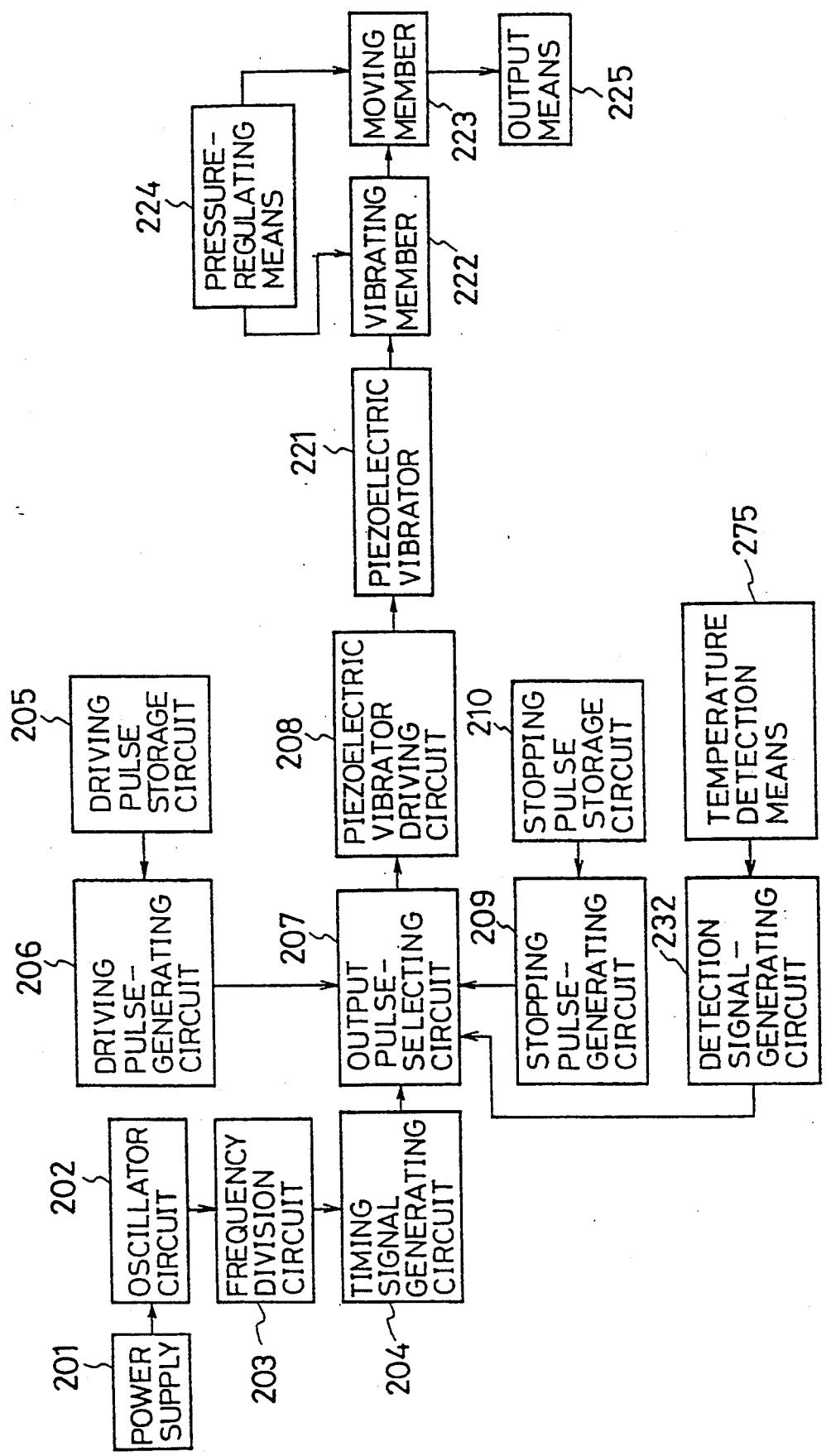
FIG. 19 is a block diagram of the sixth embodiment of the novel electronic apparatus equipped with an ultrasonic motor.

FIG. 19 is a block diagram of the sixth embodiment of the novel electronic apparatus equipped with an ultrasonic motor. The sixth embodiment of the invention uses a temperature detection means 275 as the environment detection means to detect the temperature around the electronic apparatus or the temperature around the components.

The temperature detection means 275 detects the temperature around the electronic apparatus equipped with an ultrasonic motor or the temperature around the component. A thermistor, quartz oscillator, semiconductor temperature sensor, or the like is used as the temperature detection means 275. The output signal from the detection means can take the form of a voltage. A detection signal-generating circuit 232 produces an output signal corresponding to the output signal from the detection means.

The driving pulse storage circuit 205 stores driving pulses under various conditions adapted to be produced according to the state of rotation of the moving member 223 of the ultrasonic motor. The driving pulse-generating circuit 206 receives the output signal from the driving pulse storage circuit 205 and produced driving pulses.

The stopping pulse storage circuit 210 stores stopping pulses under various conditions adapted to be produced according to the state of rotation of the moving member 223 of the ultrasonic motor. The stopping pulse-generating circuit 209 receives the output signal from the stopping pulse storage circuit 210 and delivers the stopping pulses.

The output pulse-selecting circuit 207 receives the output signal from the detection signal-generating circuit 232 and produces or ceases to produce appropriate driving pulses or stopping pulses.

The driving pulses can take the form of either traveling wave or standing wave.

Figure 20:
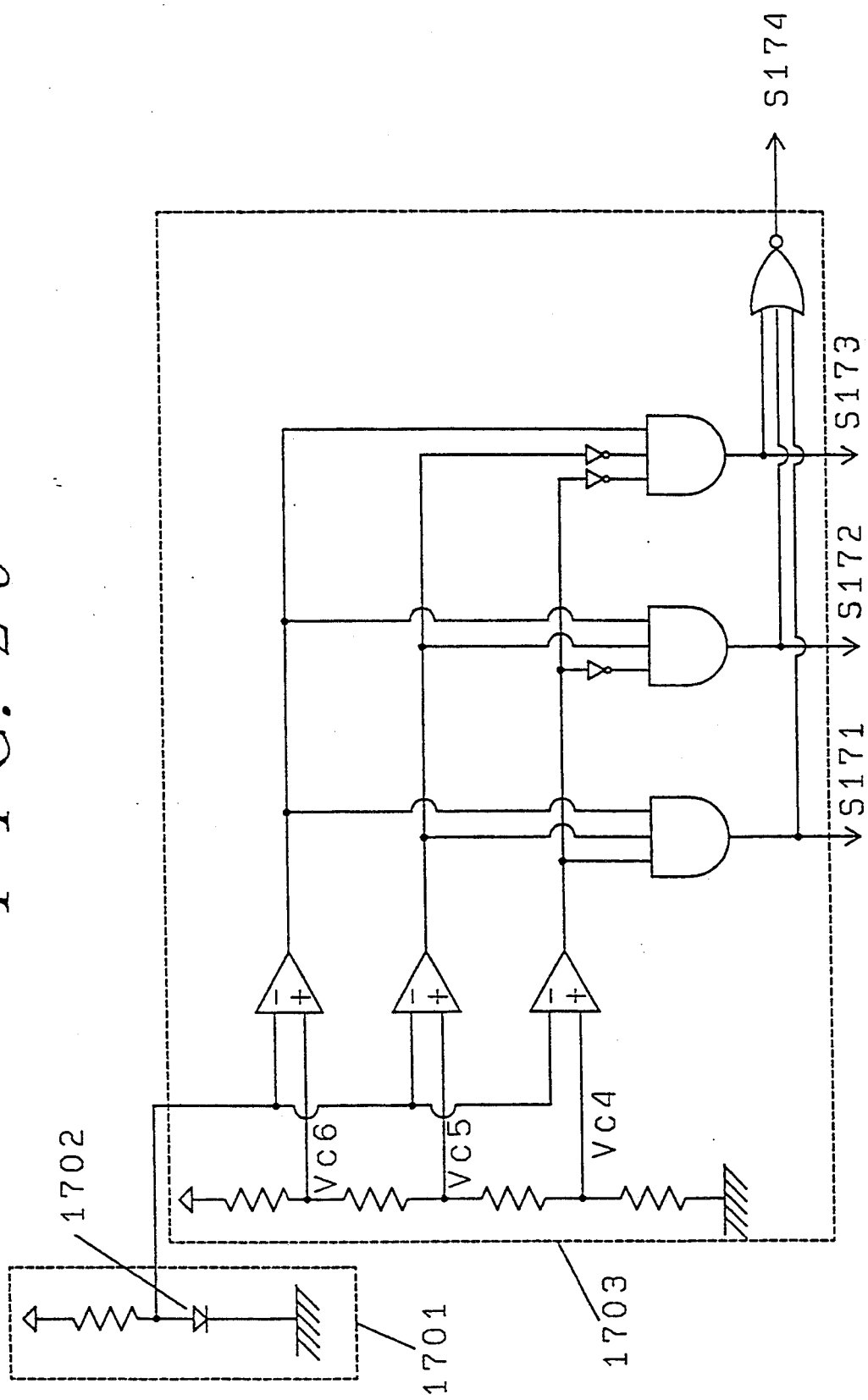
FIG. 20 is a view showing a part of the circuit of the sixth embodiment of the novel electronic apparatus equipped with an ultrasonic motor.

FIG. 20 is a diagram showing a part of the circuit of the sixth embodiment of the novel electronic apparatus equipped with an ultrasonic motor. In FIG. 20, only the differences with the circuit diagram of FIG. 7 of the first embodiment of the novel electronic apparatus equipped with an ultrasonic motor are shown.

A thermistor is used as the temperature detection means 1702 which detects the temperature around the electronic apparatus equipped with an ultrasonic motor or around the components. The output signal from the temperature detection circuit 1701 can take the form of a voltage. The detection signal-generating circuit 1703 delivers an output signal corresponding to the detected voltage. The detection signal-generating circuit 1703 compares three reference temperatures (e.g., −10° C., 25° C., and 60° C.), and produces an output signal corresponding to the temperature range.

According to the degrees of the temperatures, four output signals S171, S172, S173, and S174 are produced.

Various reference voltages can be previously set according to the specification of the ultrasonic motor and according to the conditions of actual usage.

Figure 21:
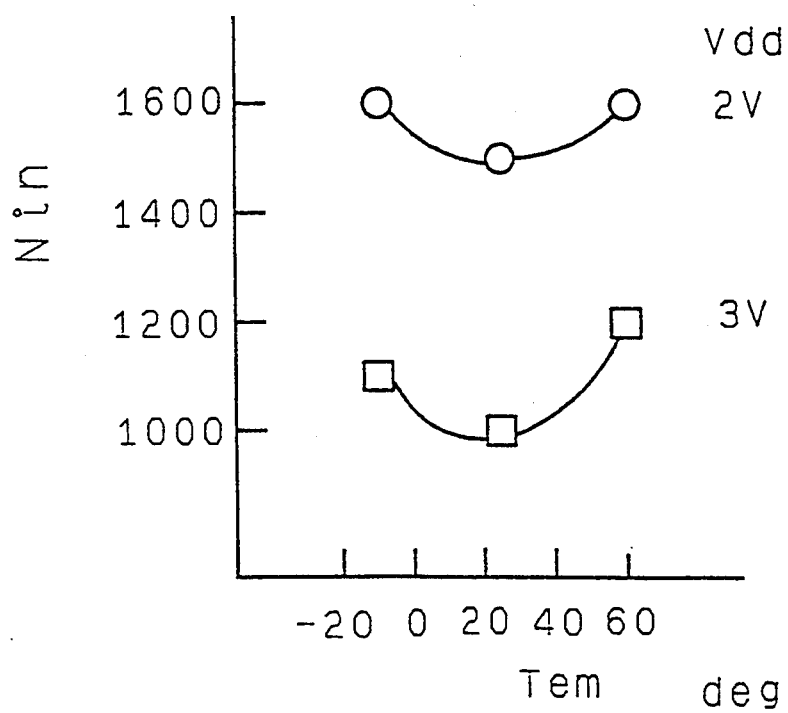
FIG. 21 is a graph showing the relation of the number of input pulses needed to rotate the moving member once to the temperature around the electronic apparatus equipped with an ultrasonic motor or around the components about the driving pulses in the sixth embodiment of the novel electronic apparatus.

FIG. 21 is a graph showing the relation of the number of input pulses needed to rotate the moving member once to the temperature around the electronic apparatus equipped with an ultrasonic motor or around the components about the driving pulses in the sixth embodiment of the novel electronic apparatus.

The values shown in FIG. 21 were obtained from a sample according to the invention, the sample having specifications given below. The input voltage is a traveling wave. The number of oscillating waves in three. The supply voltage is taken as a parameter.
vibrating member:
diameter: 10 mm, thickness: 0.9 mm,
material: aluminum alloy
pressure applied to the moving member: 10 g
input frequency: 100 kHz
number of revolutions of the output shaft: 1
supply voltage: 2.0 V, 3.0 V As shown in FIG. 21, when the supply voltage Vdd is 2.0 V, the number of input pulses Nin needed to rotate the moving member once is 1600 at −10° C., 1500 at 25° C., and 1600 at 60° C. When the supply voltage Vdd is 3.0 V the number of input pulses Nin needed to rotate the moving member once is 1100 at −10° C., 1000 at 25° C. and 1200 at 60° C. In this way, the numbers of input pulses Nin needed to rotate the moving member once under various conditions are empirically found.

The relations among the supply voltage Vdd, the temperature around the electronic apparatus equipped with an ultrasonic motor or around the components, and the number of input pulses Nin needed to rotate the moving member once are stored in the driving pulse storage circuit in the form of numerical data or relational formulas.

Figure 22:
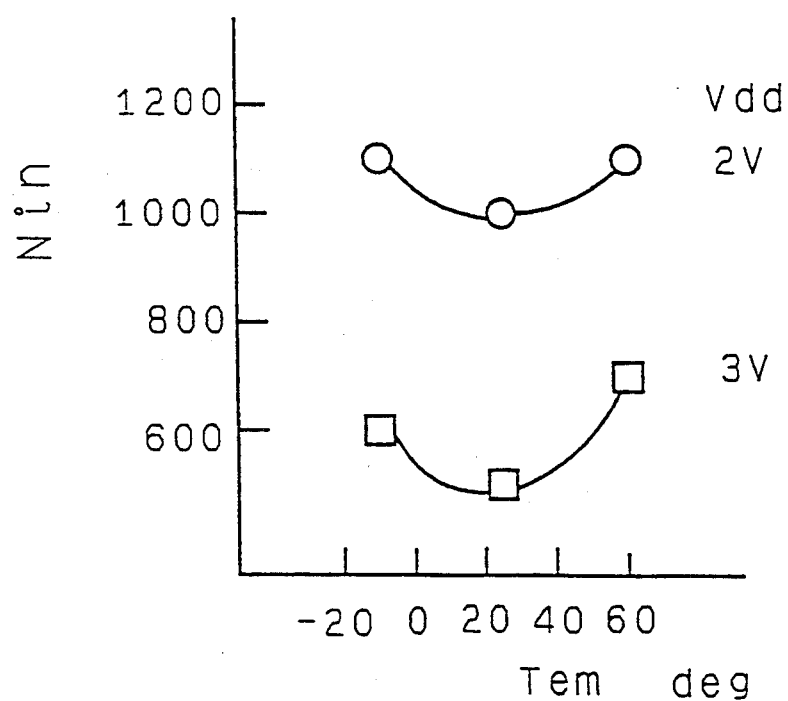
FIG. 22 is a graph showing the relation between the temperature around the electronic apparatus equipped with the ultrasonic motor or around the components and the number of input pulses needed to bring the moving member to a stop about the stopping pulses in the sixth embodiment of the novel electronic apparatus.

FIG. 22 is a graph showing the relation between the temperature around the electronic apparatus equipped with the ultrasonic motor or around the components and the number of input pulses needed to bring the moving member to a stop about the stopping pulses in the sixth embodiment of the novel electronic apparatus.

The values shown in FIG. 22 were derived from a sample having the same specifications as in FIG. 21. However, the input wave is a standing wave.

As shown in FIG. 22, when the power voltage Vdd is 2.0 V, the number of input pulses Nin needed to bring the moving member to a stop is 1100 at −10° C., 1000 at 25° C., 1100 at 60° C. When the supply voltage Vdd is 3.0 V, the number of input pulses Nin needed to bring the moving member to a stop is 600 at −10° C., 500 at 25° C., and 700 at 60° C. In this way, the number of input pulses Nin needed to bring the moving member to a stop under various conditions are empirically found.

The relations among the supply voltage Vdd, the temperature around the electronic apparatus equipped with the ultrasonic motor or around the components, and the number of input pulses Nin needed to stop the moving member under various conditions are stored in the stopping pulse storage circuit in the form of numerical data or relational formulas. Furthermore, the timing at which the driving pulses are produced and the pause intervals between the driving pulses and the stopping pause are stored in the driving pulse storage circuit or in the stopping pulse storage circuit.

The novel electronic apparatus equipped with an ultrasonic motor is designed so that it has at least one of a current detection circuit, a rotation detection circuit, a voltage detection circuit, a temperature detection circuit, and so on.

Figure 30:
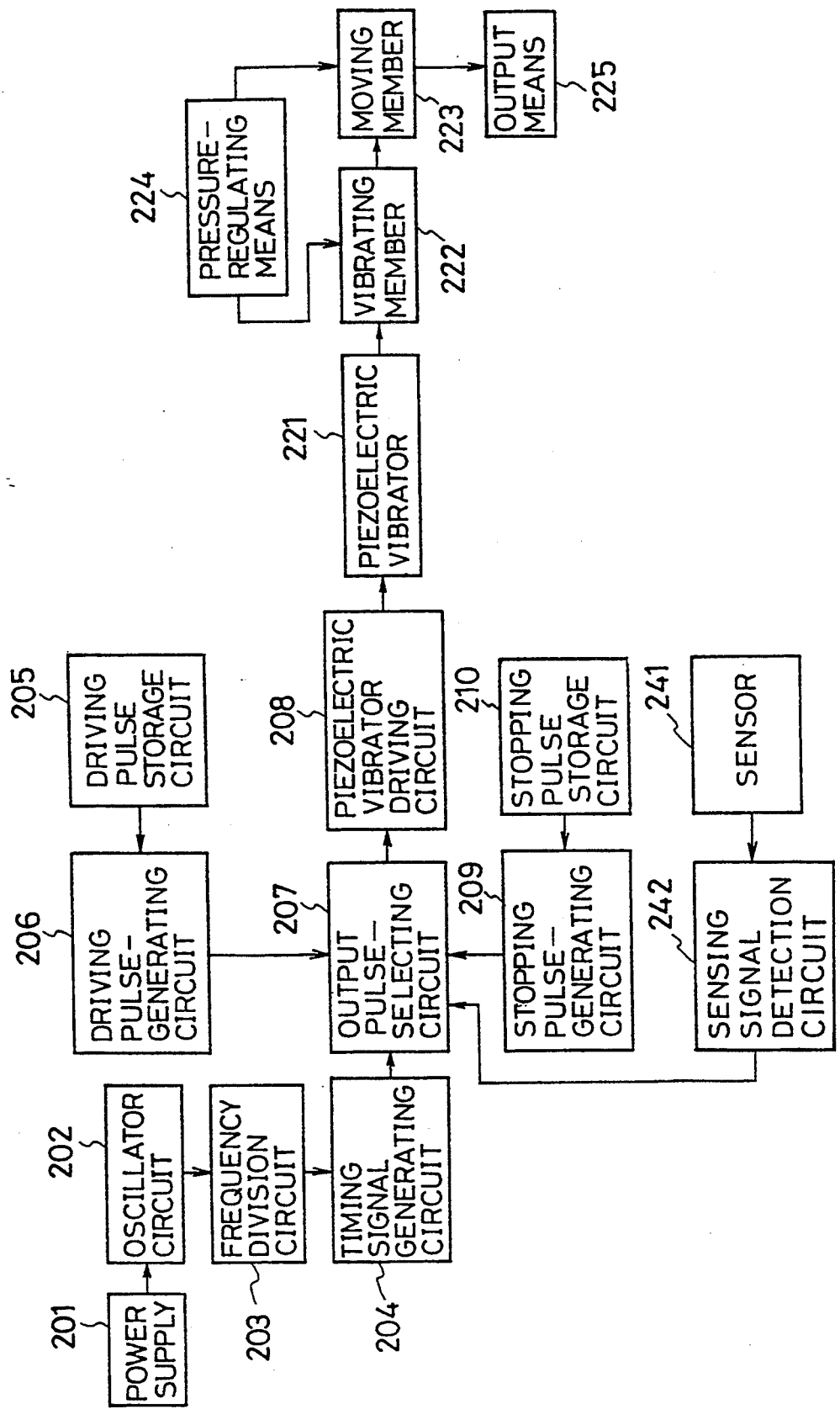
FIG. 30 is a block diagram of the embodiment of the novel electronic apparatus equipped with an ultrasonic motor, which has a censor.

Moisture, various gases, air pressure, the state of vibration, acceleration, magnetism, and so forth can be used as the environment detection means. In FIG. 30, a sensor 241 and a sensing signal detection circuit 242 are provided. The sensor 241 senses the environment. The sensing signal detection circuit 242 receives the output signal of the sensor 241 and delivers an output signal corresponding to the sensing. The details of the driving pulses, the timing at which they are produced, the pause interval between the driving pulses are the stopping pulses, and the details of the stopping pulses are stored in the driving pulse storage circuit or in the stopping pulse storage circuit.

Figure 23:
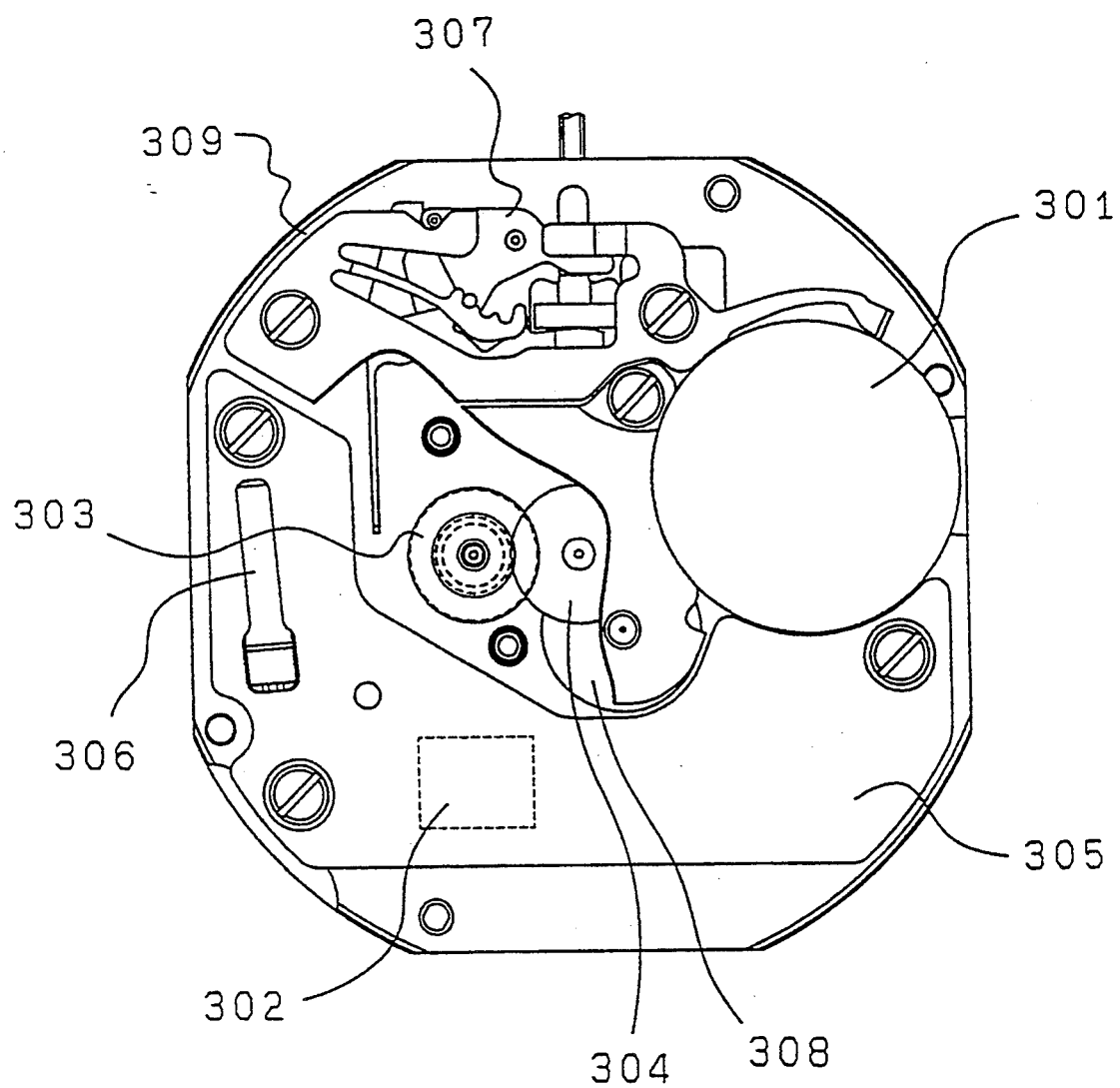
FIG. 23 is a plan view of the seventh embodiment of the novel electronic apparatus equipped with an ultrasonic motor.
Figure 24:
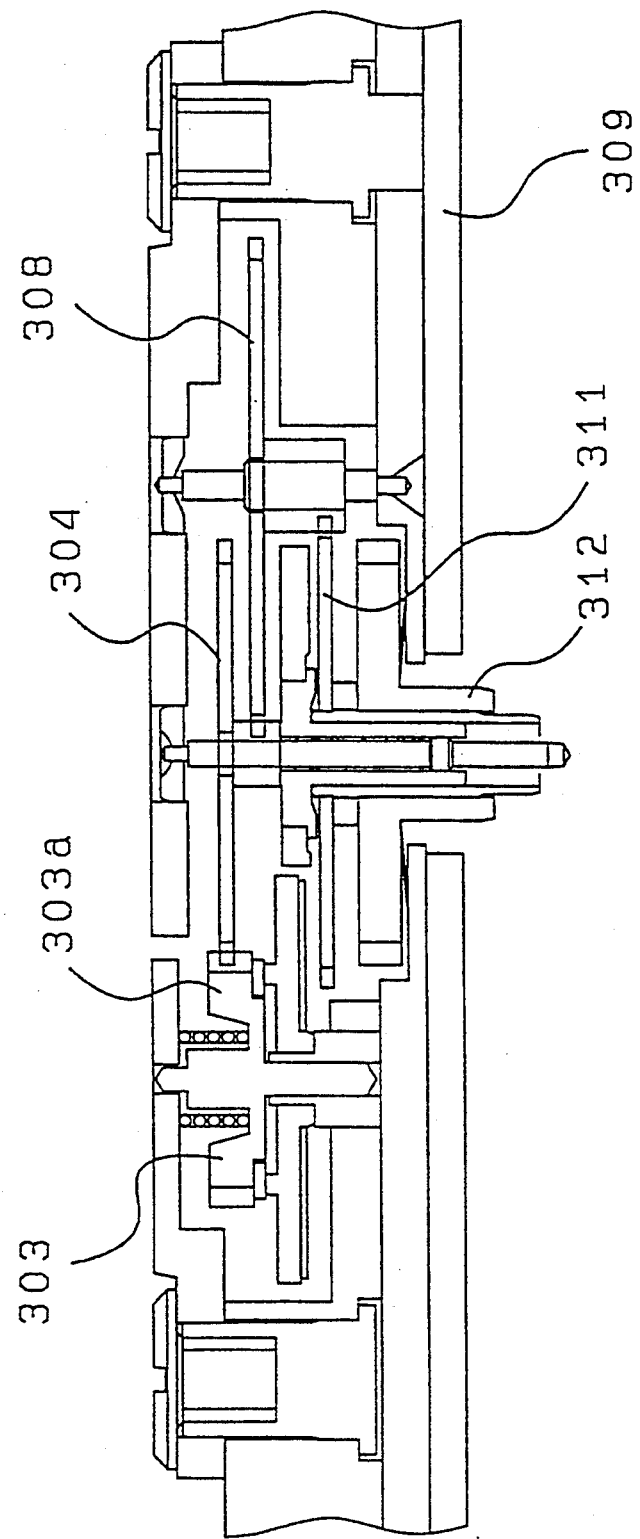
FIG. 24 is a fragmentary vertical cross section of the seventh embodiment of the novel electronic apparatus equipped with an ultrasonic motor.

FIG. 23 is a plan view of the seventh embodiment of the novel electronic apparatus equipped with an ultrasonic motor. FIG. 24 is a fragmentary vertical cross section of the seventh embodiment of the novel electronic apparatus equipped with an ultrasonic motor. FIG. 23 is a plan view of a machine, or an analog electronic timepiece, to which the novel electronic apparatus equipped with an ultrasonic motor is applied. FIG. 24 is a fragmentary vertical cross section of FIG. 23.

Referring to FIGS. 23 and 24, a setting lever 307, a yoke, a yoke holder, etc. which form a switching mechanism are mounted on a main plate 309. An integrated circuit 302 is fixedly mounted to a circuit block 305. A quartz oscillator 306 is fixedly mounted to the circuit mounted to a circuit block 305 and acts as an oscillation source. The integrated circuit 302 is powered by a battery 301.

The integrated circuit 302 has an oscillator circuit, a frequency division circuit, and a timing signal generating circuit. Given driving pulses are delivered to an ultrasonic motor 303 in response to the output signal from the timing signal-generating circuit. The motor 303 rotates through a given angle at a given rotational speed.

The ultrasonic motor 303 has a moving member 303a provided with a wheel gear which rotates a second wheel 304 through 6 degrees per second. A fifth wheel 308 is rotation of the second wheel 304. A minute wheel 311 is rotated through 6 degrees per second by rotation of the fifth wheel 308. An hour wheel 312 is rotated twice per day by rotation of the minute wheel 311 via a day back wheel (not shown in the drawing).

The time is displayed by an hour hand (not shown) mounted to hour wheel 312, a minute hand (not shown) mounted to the minute wheel 311, and a second hand (not shown) mounted to the second wheel 304.

The integrated circuit 302 has at least one of a current detection circuit, a rotation detection circuit, a voltage detection circuit, a temperature detection circuit, and so on. The detection signal-generating circuit produces an output signal according to the output signals from these environment detection means.

The integrated circuit 302 has an output pulse-selecting circuit. The output pulse-selecting circuit receives the output signal from the detection signal-generating circuit and produces or ceases to produce driving pulses or stopping pulses having appropriate details.

The ultrasonic motor of the novel analog electronic timepiece performs operation with certainty according to the environment and, therefore, it displays the time accurately.

Figure 25:
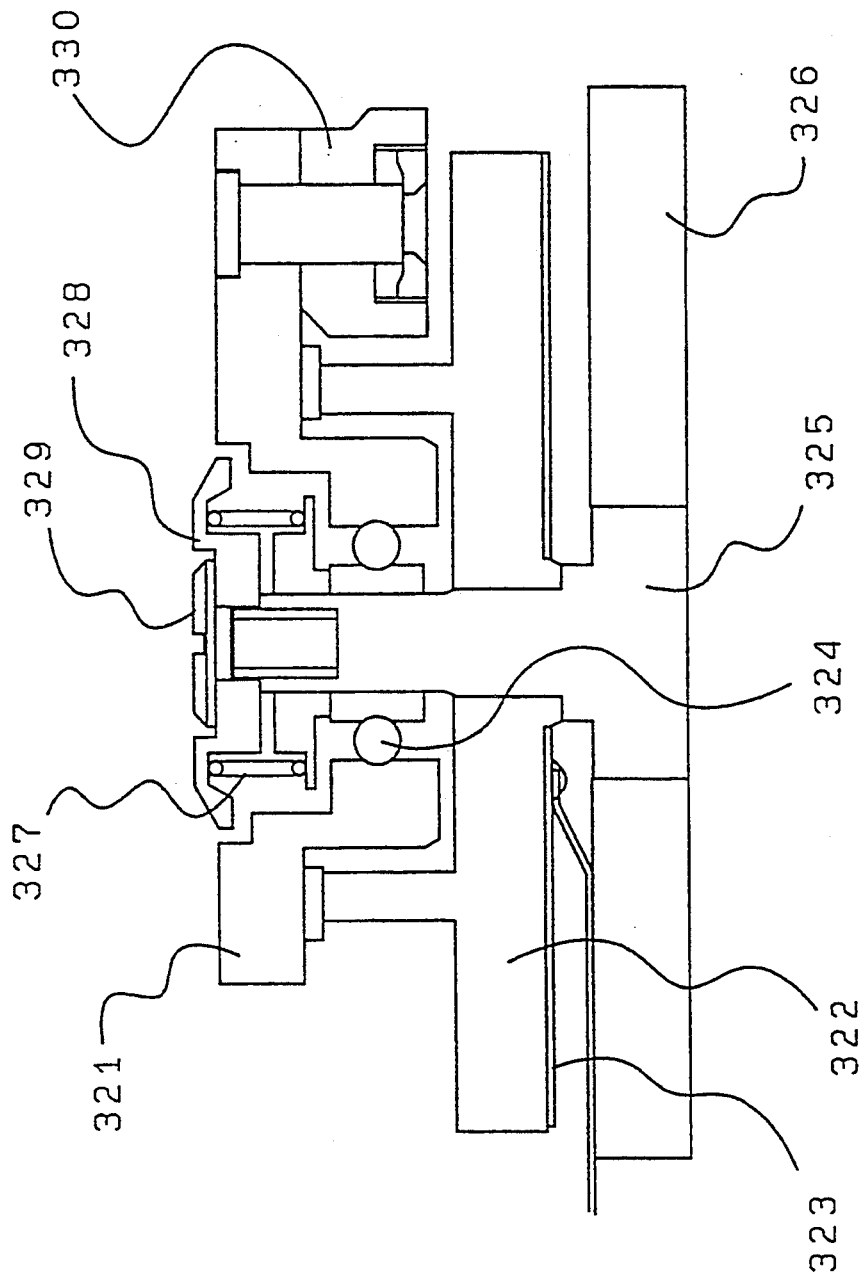
FIG. 25 is a fragmentary vertical cross section of the eight embodiment of the novel electronic apparatus equipped with an ultrasonic motor.
Figure 26:
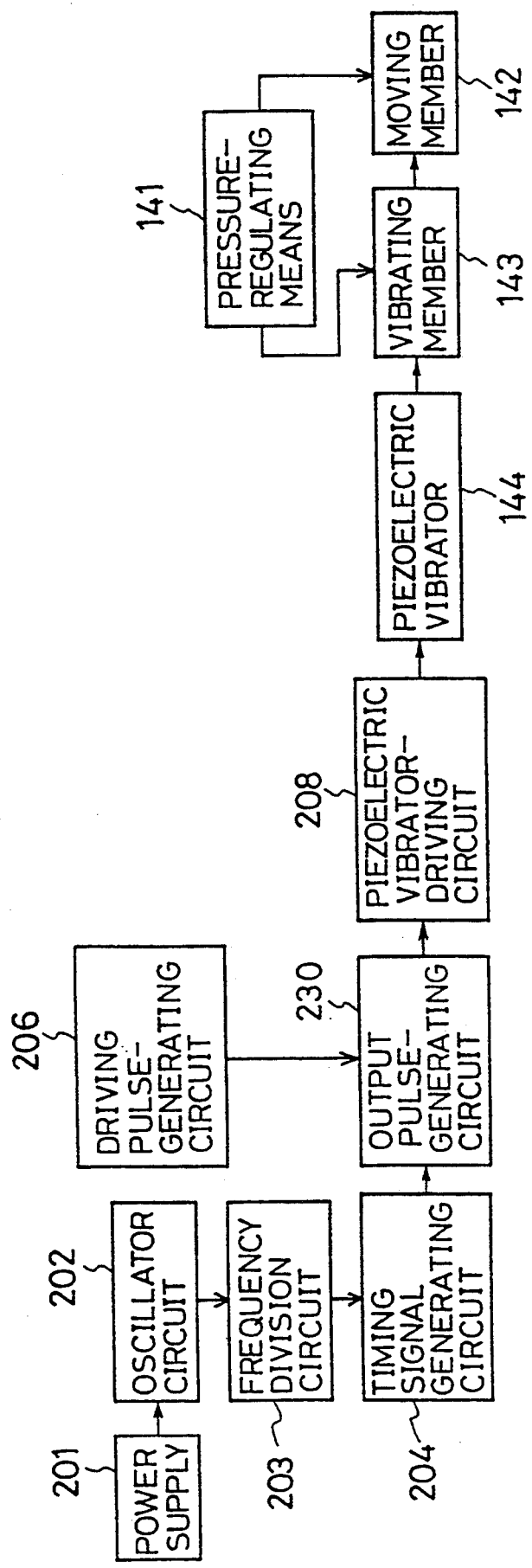
FIG. 26 is a block diagram of the prior art electronic apparatus equipped with an ultrasonic motor.
Figure 27:
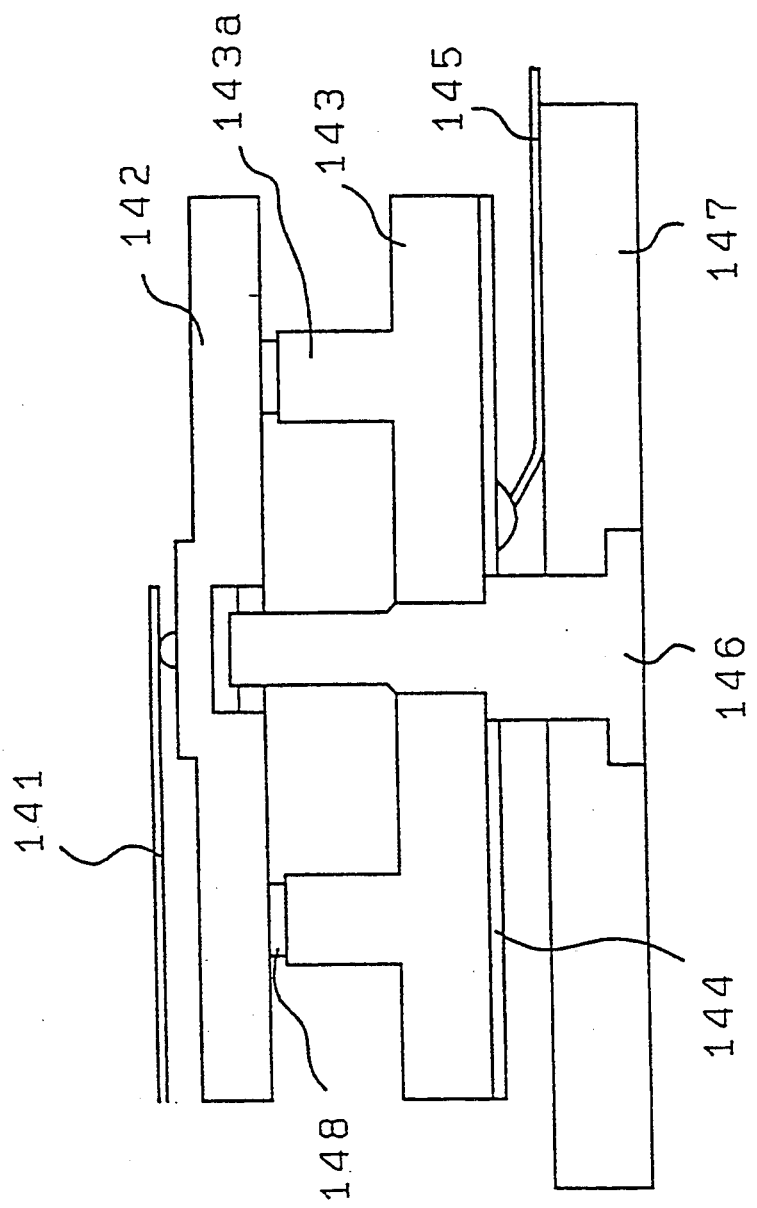
FIG. 27 is a cross-sectional view of the prior art ultrasonic motor.
Figure 28:
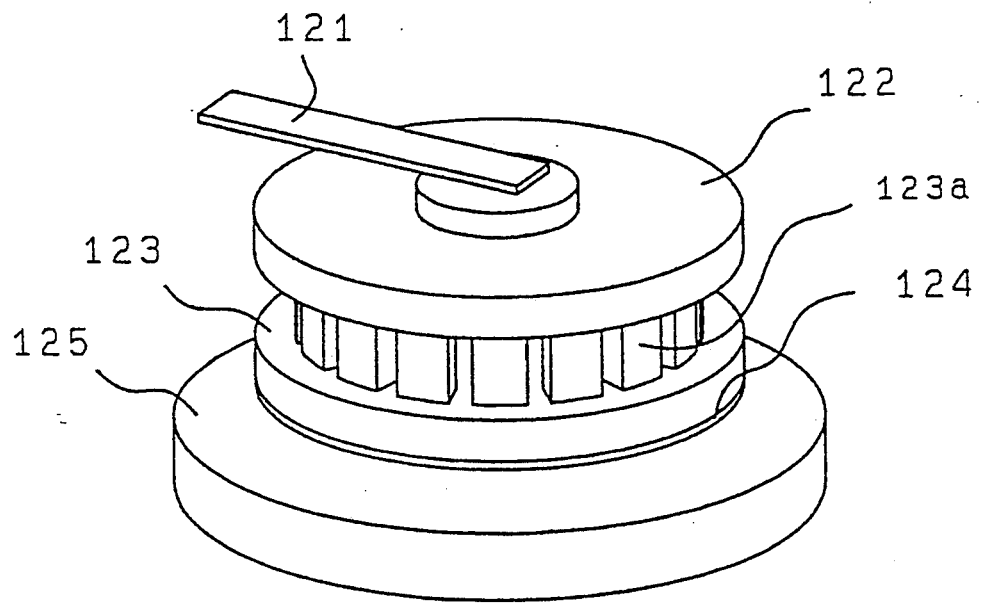
FIG. 28 is a perspective view of the prior art traveling wave type ultrasonic motor.
Figure 29:
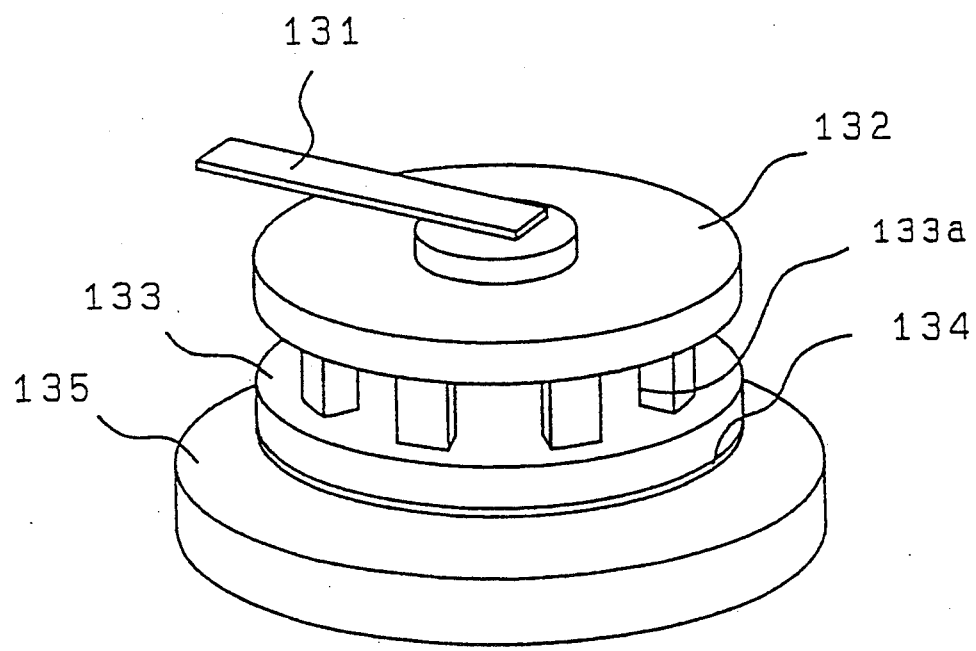
FIG. 29 is a perspective view of the prior art standing wave type ultrasonic motor.

FIG. 25 is a fragmentary vertical cross section of the eighth embodiment of the novel electronic apparatus equipped with an ultrasonic motor. FIG. 25 is a fragmentary vertical cross section of a machine, or a vibrating alarm electronic timepiece, to which the novel electronic apparatus equipped with an ultrasonic motor is applied.

Referring to FIG. 25, a central shaft 325 is rigidly fixed to an anchor block 326. A vibrating member 322 is firmly mounted to the central shaft 325. A piezoelectric vibrator 323 is adhesively bonded to the underside of the vibrating member 322. The piezoelectric vibrator 322 is polarized into a given shape. A lead wire connects the electrode pattern on the piezoelectric vibrator 322 with a circuit for driving the piezoelectric vibrator.

The vibrating member 322 is provided with a plurality of comb-like projections. A moving member 321 makes contact with the comb-like projections of the vibrating member 322 via friction member. The moving member 321 is rotatably mounted to the central shaft 325 via ball bearings. A pressure-regulating spring 327 presses the moving member 321 against the comb-like projections of the vibrating member 322. A pressure-regulating spring holder 328 holds down the pressure-regulating spring 327. A pressure-regulating spring holder spring 329 holds the pressure-regulating spring holder 328.

The circuit for driving the piezoelectric vibrator applies a given high frequency voltage to the piezoelectric vibrator 323. Ultrasonic vibration is induced in the vibrating member 322. The moving member 321 is rotated via the frictional force of the friction member.

An eccentric weight 330 is rigidly mounted to the moving member 321. The weight 330 is made of a tungsten alloy of a large specific gravity or the like. The weight 330 is substantially semicircular in shape.

When the moving member 321 is rotated, the eccentric weight 330 rotates with the moving member 321. The rotation of the weight 330 vibrates the anchor block 326.

Figure 31:
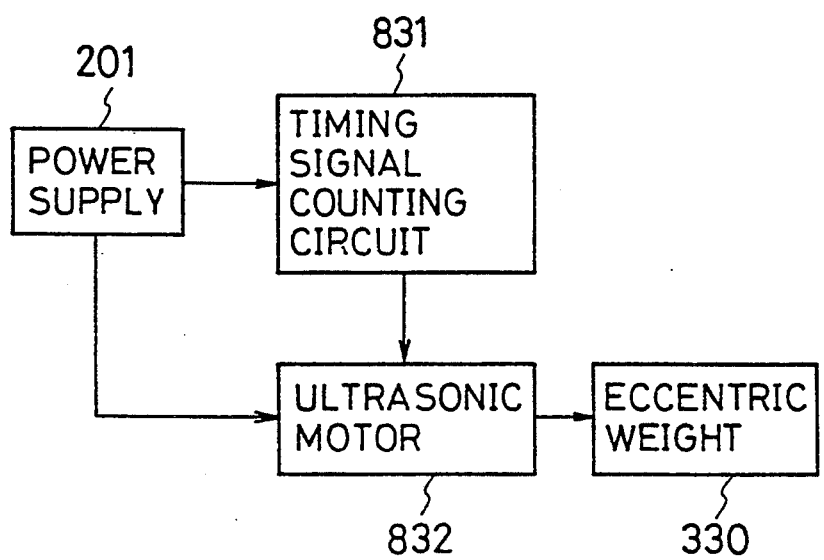
FIG. 31 is a block diagram of the embodiment of the novel vibrating alarm clock and vibrating timer.

In FIG. 31, a vibrating alarm clock or vibrating timer can be realized by incorporating a timing signal counting circuit 831 into the electronic circuit to permit the eccentric weight 330 which is rotated by a ultrasonic motor 832 to be rotated at a desired time.

Applications of the eighth embodiment of the novel electronic apparatus equipped with an ultrasonic motor include pocket bells, pagers, transceivers, mobile telephones, and alarms. These information transmission apparatus utilize a vibrating motor to inform the carrier of the apparatus that information has been entered in response to an external signal.

Figure 32:
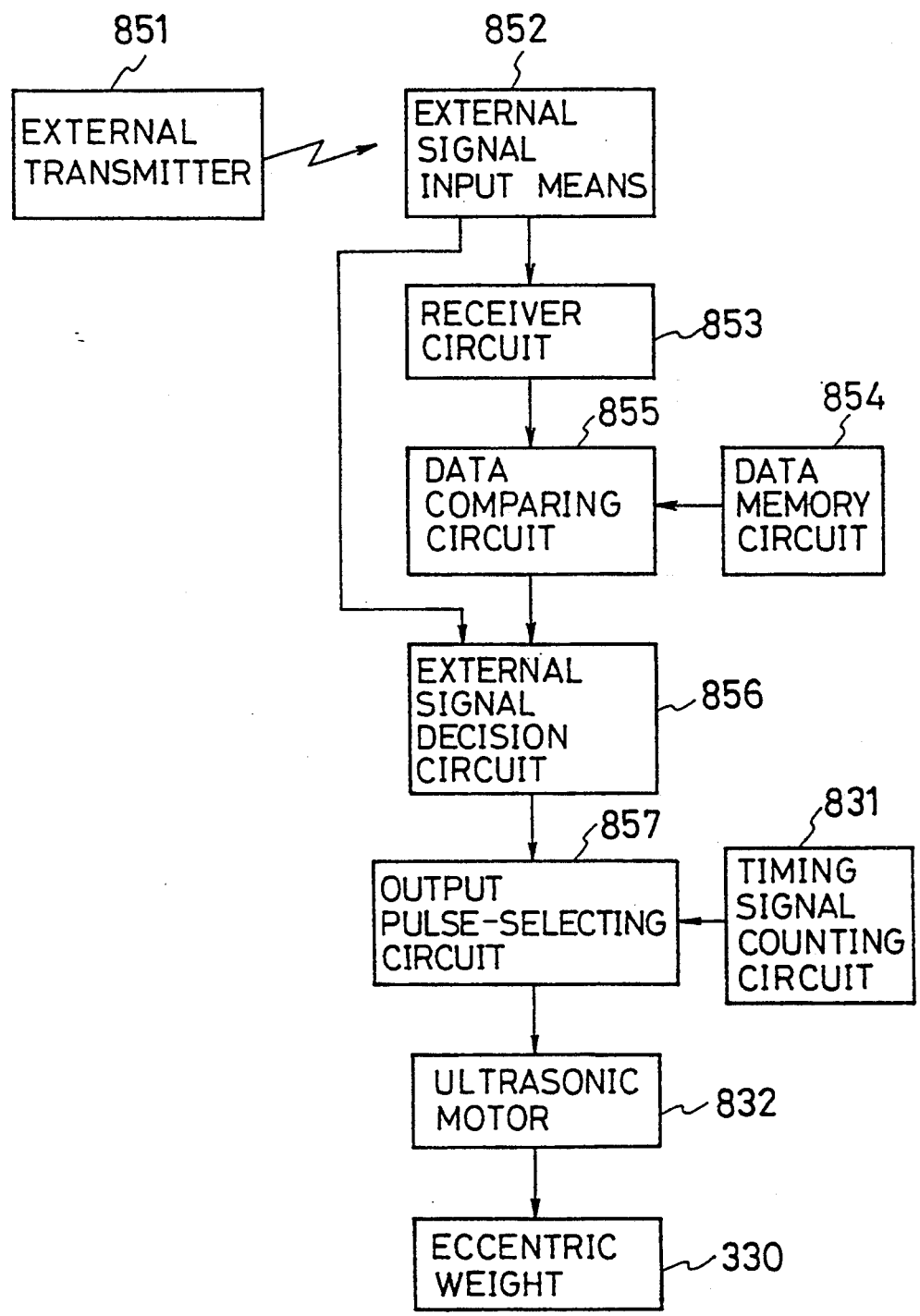
FIG. 32 is a block diagram of the embodiment of the novel pocket bell, pager, mobile telephone, and alarm.

In FIG. 32, an external transmitter 851 sends out desired information by radio communication or other method. The external signal input means 852 of the information transmission apparatus such as an antenna receives the output signal from the external information transmission apparatus. The received signal is amplified by a receiver circuit 853, converted into other form. A data comparing circuit 855 compares the converted data with given data stored in a data memory circuit 854 of information transmission apparatus. An external signal decision circuit 856 which is operated by the output signal from the external signal input means 852 determines whether the input signal is a signal for operating the information transmission apparatus. An output pulse-selecting circuit 857 receives the output signal from the external signal decision circuit and the output signal from the timing signal counting circuit 831 and operates.

If the input signal is a signal for operating the information transmission apparatus, then the output pulse-selecting circuit 857 is operated to thereby rotate the ultrasonic motor 832, thus driving the eccentric weight 330 of the vibrating motor. The vibration of the information transmission apparatus is transmitted to the carrier by the operation of the vibrating motor. Thus, the carrier is informed of the input of information.

Accordingly, the invention yields the following advantages.

(1) Since the ultrasonic motor is driven with driving pulses adapted for the environmental conditions, the amount of electric power consumed is small.

(2) The operation of the ultrasonic motor is stabilized irrespective of the environmental conditions.

(3) The ultrasonic motor is driven with driving pulses adapted for the environmental conditions. Also, the driving pulses are stopped. The ultrasonic motor is stopped with stopping pulses adapted for the environmental conditions. Therefore, the angular position of the output means can be easily and accurately controlled.

What is claimed is:

1. An electronic apparatus equipped with an ultrasonic motor comprising:
   a power supply;
   an oscillator circuit which is powered by the power supply and delivers a given output signal;
   a frequency division circuit receiving the output signal from the oscillator circuit and dividing the frequency;
   a timing signal generating circuit receiving the output signal from the frequency division circuit and delivering a given timing signal;
   an ultrasonic vibration-generating circuit receiving the output signal from the timing signal generating circuit and producing ultrasonic vibration that activates the ultrasonic motor;
   a piezoelectric vibrator receiving the output signal from the ultrasonic vibration-generating circuit, and vibrating;
   a vibrating member incorporating the piezoelectric vibrator;
   a moving member making contact with the vibrating member;
   a pressure-regulating means applying a given pressure to the vibrating member and to the moving member;
   an output means operated by operation of the moving member;
   a driving pulse storage circuit storing a plurality of driving pulses which produce given ultrasonic vibration in the vibrating member to operate the moving member;
   a driving pulse-generating circuit which receives the output signal from the driving pulse storage circuit and produces the driving pulses;
   a stopping pulse storage circuit storing a plurality of stopping pulses for stopping the operation of the moving member;

a stopping pulse-generating circuit receiving the output signal from the stopping pulse storage circuit and producing the stopping pulses;

an environment detection means which detects the environment or the states of the components of the electronic apparatus or the environment around the components of the electronic apparatus and delivers an output signal corresponding to the environment; and an output pulse-selecting circuit which receives the output signal from the driving pulse-generating circuit and the output signal from the stopping pulse-generating circuit, and controls an operation for producing output pulses corresponding to the result of the detection made by the environment detection means to the ultrasonic vibration-generating circuit.

2. An electronic apparatus equipped with an ultrasonic motor comprising:

a power supply;

an oscillator circuit which is powered by the power supply and delivers a given output signal;

a frequency division circuit receiving the output signal from the oscillator circuit and dividing the frequency;

a timing signal-generation circuit receiving the output signal from the frequency division circuit and delivering a given timing signal;

an ultrasonic vibration-generating circuit receiving the output signal from the timing signal generation circuit and producing ultrasonic vibration to activate the ultrasonic motor;

a piezoelectric vibrator receiving the output signal from the ultrasonic vibration-generating circuit and vibrating;

a vibrating member incorporating the piezoelectric vibrator;

a moving member making contact with the vibrating member;

a pressure-regulating means applying a given pressure to the vibrating member and to the moving member;

an output means operated by operation of the moving member;

a driving pulse storage circuit storing a plurality of driving pulses which produce given ultrasonic vibration in the vibrating member to operate the moving member;

a driving pulse-generating circuit which receives the output signal from the driving pulse storage circuit and produces the driving pulses;

an environment detection means which detects the environment or the states of the components of the electronic apparatus or the environment around the components of the electronic apparatus and delivers an output signal corresponding to the environment; and an output pulse-selecting circuit which receives the output signal from the driving pulse-generating circuit and controls an operation for producing output pulses corresponding to the result of the detection made by the environment detection means to the ultrasonic vibration-generating circuit.

3. An electronic apparatus equipped with an ultrasonic motor comprising:

a power supply;

an oscillator circuit which is powered by the power supply and delivers a given output signal;

a frequency division circuit receiving the output signal from the oscillator circuit and dividing the frequency;

a timing signal generating circuit receiving the output signal from the frequency division circuit and delivering a given timing signal;

an ultrasonic vibration-generating circuit receiving the output signal from the timing signal generating circuit and producing ultrasonic vibration that activates the ultrasonic motor;

a piezoelectric vibrator receiving the output signal from the ultrasonic vibration-generating circuit and vibrating;

a vibrating member incorporating the piezoelectric vibrator;

a moving member making contact with the vibrating member;

a pressure-regulating means applying a given pressure to the vibrating member and to the moving member, an output means operated by operation of the moving member;

a driving pulse storage circuit storing a plurality of driving pulses which produce given ultrasonic vibration in the vibrating member and operate the moving member;

a driving pulse-generating circuit which receives the output signal from the driving pulse storage circuit and produces the driving pulses;

a stopping pulse storage circuit which stores a plurality of stopping pulses for stopping the operation of the moving member;

a stopping pulse-generating circuit which receives the output signal from the stopping pulse storage circuit and produces the stopping pulses;

a current detection circuit which receives at least one of the output signal from the ultrasonic vibration-generating circuit, the output signal from the piezoelectric vibrator, and the output signal from the vibrating member, detects its current, and delivers an output signal corresponding to the current; and an output pulse-selecting circuit which receives the output signal from the driving pulse-generating circuit and the output signal from the stopping pulse-generating circuit, and controls an operation that produces output pulses corresponding to the output signal from the current detection circuit to the ultrasonic vibration-generating circuit.

4. An electronic apparatus equipped with an ultrasonic motor comprising:

a power supply;

an oscillator circuit which powered by the power supply and delivers a given output signal;

a frequency division circuit receiving the output signal from the oscillator circuit and dividing the frequency;

a timing signal generating circuit receiving the output signal from the frequency division circuit and delivering a given timing signal;

an ultrasonic vibration-generating circuit receiving the output signal from the timing signal generating circuit and producing ultrasonic vibration that activates the ultrasonic motor;

a piezoelectric vibrator receiving the output signal from the ultrasonic vibration-generating circuit and vibrating;

a vibrating member incorporating the piezoelectric vibrator;

a moving member making contact with the vibrating member;

a pressure-regulating means applying a given pressure to the vibrating member and to the moving member;

an output means operated by operation of the moving member;

a driving pulse storage circuit storing a plurality of driving pulses which produce given ultrasonic vibration in the vibrating member to operate the moving member;

a driving pulse-generating circuit which receives the output signal from the driving pulse storage circuit and produces the driving pulses;

a stopping pulse storage circuit which stores a plurality of stopping pulses for stopping the operation of the moving member;

a stopping pulse-generating circuit which receives the output signal from the stopping pulse storage circuit and produces the stopping pulses;

a rotation detection means detecting the state of operation of the output means;

a rotation detection circuit which receives the output signal from the rotation detection means and delivers an output signal corresponding to the state of operation of the output means; and an output pulse-selecting circuit which receives the output signal from the driving pulse-generating circuit and the output signal from the stopping pulse-generating circuit and controls an operation that produces output pulses corresponding to the output signal from the rotation detection circuit to the ultrasonic vibration-generating circuit.

5. An analog electronic timepiece comprising:

a power supply;

an oscillator circuit which is powered by the power supply and delivers a given output signal;

a frequency division circuit receiving the output signal from the oscillator circuit and dividing the frequency;

a timing signal generating circuit receiving the output signal from the frequency division circuit and delivering a given timing signal;

an ultrasonic vibration-generating circuit receiving the output signal from the timing signal generating circuit and producing ultrasonic vibration that activates the ultrasonic motor;

a piezoelectric vibrator receiving the output signal from the ultrasonic vibration-generating circuit and vibrating;

a vibrating member incorporating the piezoelectric vibrator;

a moving member making contact with the vibrating member;

a pressure-regulating means applying a given pressure to the vibrating member and to the moving member;

a display means which is operated by operation of the moving member and displays information about desired time;

a driving pulse storage circuit storing a plurality of driving pulses which produce given ultrasonic vibration in the vibrating member and operate the moving member;

a driving pulse-generating circuit which receives the output signal from the driving pulse storage circuit and produces the driving pulses;

a stopping pulse storage circuit which stores a plurality of stopping pulses for stopping the operation of the moving member;

a stopping pulse-generating circuit which receives the output signal from the stopping pulse storage circuit and produces the stopping pulses;

an environment detection means which detects the environment or the states of the components of the electronic apparatus or the environment around the components of the electronic apparatus and delivers an output signal corresponding to the environment; and an output pulse-selecting circuit which receives the output signal from the driving pulse-generating circuit and the output signal from the stopping pulse generating circuit and controls an operation for producing output pulses corresponding to the result of the detection made by the environment detection means to the ultrasonic vibration-generating circuit.

6. An electronic time information apparatus comprising:

a power supply;

an oscillator circuit which is powered by the power supply and delivers a given output signal;

a frequency division circuit receiving the output signal from the oscillator circuit and dividing the frequency;

a timing signal generating circuit receiving the output signal from the frequency division circuit and delivering a given timing signal;

an ultrasonic vibration-generating circuit which receives the output signal from the timing signal generating circuit and which, when a desired time comes or passes, produces ultrasonic vibration for activating an ultrasonic motor;

a piezoelectric vibrator receiving the output signal from the ultrasonic vibration-generating circuit and vibrating;

a vibrating member incorporating the piezoelectric vibrator;

a moving member making contact with the vibrating member;

an eccentric weight actuated by operation of the moving member;

a pressure-regulating means applying a given pressure to the vibrating member and to the moving member;

a display means which is operated by operation of the moving member and displays information about desired time;

a driving pulse storage circuit storing a plurality of driving pulses which produce given ultrasonic vibration in the vibrating member to operate the moving member;

a driving pulse-generating circuit which receives the output signal from the driving pulse storage circuit and produces the driving pulses;

a stopping pulse storage circuit which stores a plurality of stopping pulses for stopping the operation of the moving member;

a stopping pulse-generating circuit which receives the output signal from the stopping pulse storage circuit and produces the stopping pulses;

an environment detection means which detects the environment or the states of the components of the electronic apparatus or the environment around the components of the electronic apparatus and delivers an output signal corresponding to the environment; and an output pulse-generating circuit which receives the output signal from the driving pulse-generating circuit and the output signal from the stopping pulse-generating circuit and controls an operation for producing output pulses corresponding to the result of the detection made by the environment detection means to the ultrasonic vibration-generating circuit.

7. An information transmission apparatus comprising:

a power supply;

an oscillator circuit which is powered by the power supply and delivers a given output signal;

a frequency division circuit receiving the output signal from the oscillator circuit receiving the output signal from the oscillator circuit and dividing the frequency;

a timing signal generating circuit receiving the output signal from the frequency division circuit and delivering a given timing signal;

an external signal input means receiving the output signal from an external information transmission device;

an external signal decision circuit operated by the output signal from the external signal input means;

a piezoelectric vibrator receiving the output signal from said ultrasonic vibration-generating circuit and vibrating;

a vibrating member incorporating the piezoelectric vibrator;

a moving member making contact with the vibrating member;

an eccentric weight actuated by operation of the moving member;

a pressure-regulating means applying a given pressure to the vibrating member and to the moving member;

a display means which is operated by operation of the moving member and displays information about desired time;

a driving pulse storage circuit storing a plurality of driving pulses which produce give ultrasonic vibration in the vibrating member to operate the moving member;

a driving pulse-generating circuit which receives the output signal from the driving pulse storage circuit and produces the driving pulses;

a stopping pulse storage circuit which stores a plurality of stopping pulses for stopping the operation of the moving member;

a stopping pulse-generating circuit which receives the output signal from the stopping pulse storage circuit and produces the stopping pulses;

an environment detection means which detects the environment or the states of the components of the electronic apparatus or the environment around the components of the electrolytic apparatus and delivers an output signal corresponding to the environment; and an output pulse-generating circuit which receives the output signal from the external signal decision circuit and the output from the driving pulse-generating circuit and the output signal from the stopping pulse-generation circuit and controls a operation for producing output pulses corresponding to the result of the detection made by the environment detection means to the ultrasonic vibration-generating circuit.

8. An electronic apparatus equipped with an ultrasonic motor comprising:

a power supply;

an oscillator circuit which is powered by the power supply and delivers a given output signal;

a frequency division circuit receiving the output signal from the oscillator circuit and dividing the frequency;

a timing signal generating circuit receiving the output signal from the frequency division circuit and delivering a given timing signal;

an ultrasonic vibration-generating circuit receiving the output signal from the timing signal generating circuit and producing ultrasonic vibration that activates the ultrasonic motor;

a piezoelectric vibrator receiving the output signal from the ultrasonic vibration-generating circuit and vibrating;

a vibrating member incorporating the piezoelectric vibrator;

a moving member making contact with the vibrating member;

a pressure-regulating means applying a given pressure to the vibrating member and to the moving member;

an output means operated by operation of the moving member;

a driving pulse storage circuit storing a plurality of driving pulses which produce given ultrasonic vibration in the vibrating member to operate the moving member;

a driving pulse-generating circuit which receives output signal from the driving pulse storage circuit and produces the driving pulses;

a stopping pulse storage circuit storing a plurality of stopping pulses for stopping the operation of the moving member;

a stopping pulse-generating circuit receiving the output signal from the stopping pulse storage circuit and producing the stopping pulses;

a sensing means which senses the environment around the components of the electronic apparatus and delivers an output signal corresponding to the environment; and an output pulse-selecting circuit which receives the output signal from the driving pulse-generating circuit and the output signal from the stopping pulse-generating circuit, and controls an operation for producing output pulses corresponding to the result of the detection made by the sensing means to the ultrasonic vibration-generating circuit.

* * * * *